United States Patent
Suemasu

(10) Patent No.: US 8,066,905 B2
(45) Date of Patent: Nov. 29, 2011

(54) OPTICAL ELEMENT OBTAINED BY HOMEOTROPICALLY ORIENTING LIQUID CRYSTAL MOLECULE, MEMBER FOR LIQUID CRYSTAL DISPLAY DEVICE USING THE SAME, AND LIQUID CRYSTAL DISPLAY DEVICE

(75) Inventor: Atsushi Suemasu, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 12/379,241

(22) Filed: Feb. 17, 2009

(65) Prior Publication Data

US 2009/0162542 A1    Jun. 25, 2009

Related U.S. Application Data

(63) Continuation of application No. 11/408,936, filed on Apr. 24, 2006, now abandoned.

(30) Foreign Application Priority Data

Apr. 28, 2005   (JP) ................................. 2005-133614

(51) Int. Cl.
  *C09K 19/00*    (2006.01)
  *C09K 19/06*    (2006.01)
  *C09K 19/32*    (2006.01)
  *C09K 19/52*    (2006.01)

(52) U.S. Cl. .................... 252/299.01; 428/1.1; 428/1.3; 430/20; 349/187

(58) Field of Classification Search .................... 430/20, 430/270.1; 428/1.1–1.3; 252/299.01; 349/187
See application file for complete search history.

(56) References Cited

U.S. PATENT DOCUMENTS

| 5,680,184 | A | 10/1997 | Nishino |
| 7,514,126 | B2 * | 4/2009 | Suemasu ........................ 428/1.1 |
| 7,582,336 | B2 * | 9/2009 | Suemasu ........................ 428/1.1 |
| 7,622,166 | B2 * | 11/2009 | Ishizaki et al. ............... 428/1.23 |
| 2005/0195479 | A1 * | 9/2005 | Ishizaki et al. ................ 359/490 |
| 2006/0221282 | A1 | 10/2006 | Suemasu et al. |
| 2006/0222974 | A1 | 10/2006 | Suemasu et al. |
| 2006/0246229 | A1 | 11/2006 | Suemasu |
| 2007/0087135 | A1 | 4/2007 | Hayashi |
| 2007/0206129 | A1 | 9/2007 | Nakamura et al. |
| 2009/0162542 | A1 * | 6/2009 | Suemasu ........................ 427/162 |

FOREIGN PATENT DOCUMENTS

| CN | 1116316 A | 2/1996 |
| CN | 1462898 A | 12/2003 |
| JP | A-05-142531 | 6/1993 |
| JP | A-2002-174724 | 6/2002 |
| JP | A-2002-174725 | 6/2002 |
| JP | A-2003-121852 | 4/2003 |
| JP | A-2005-165238 | 6/2005 |

* cited by examiner

*Primary Examiner* — Geraldina Visconti
(74) *Attorney, Agent, or Firm* — Oliff & Berridge, PLC

(57) ABSTRACT

An object of the present invention is to provide an optical element which can suppress a production cost, has good heat resistance, uniformly maintains the fixed orientation of a liquid crystal polymer in a wide temperature range, shows a low haze with reliability, and can maintain desired birefringence property with reliability. The present invention relates to an optical element formed by forming, on an upper surface of a base material having light transmittance, at least a birefringence layer having a structure obtained by fixing liquid crystal monomers each having a polymerizable group at a terminal thereof in a state where the monomers are homeotropically oriented, and by removing an additive layer formed on the upper surface of the birefringence layer.

8 Claims, 9 Drawing Sheets

[FIG. 1]
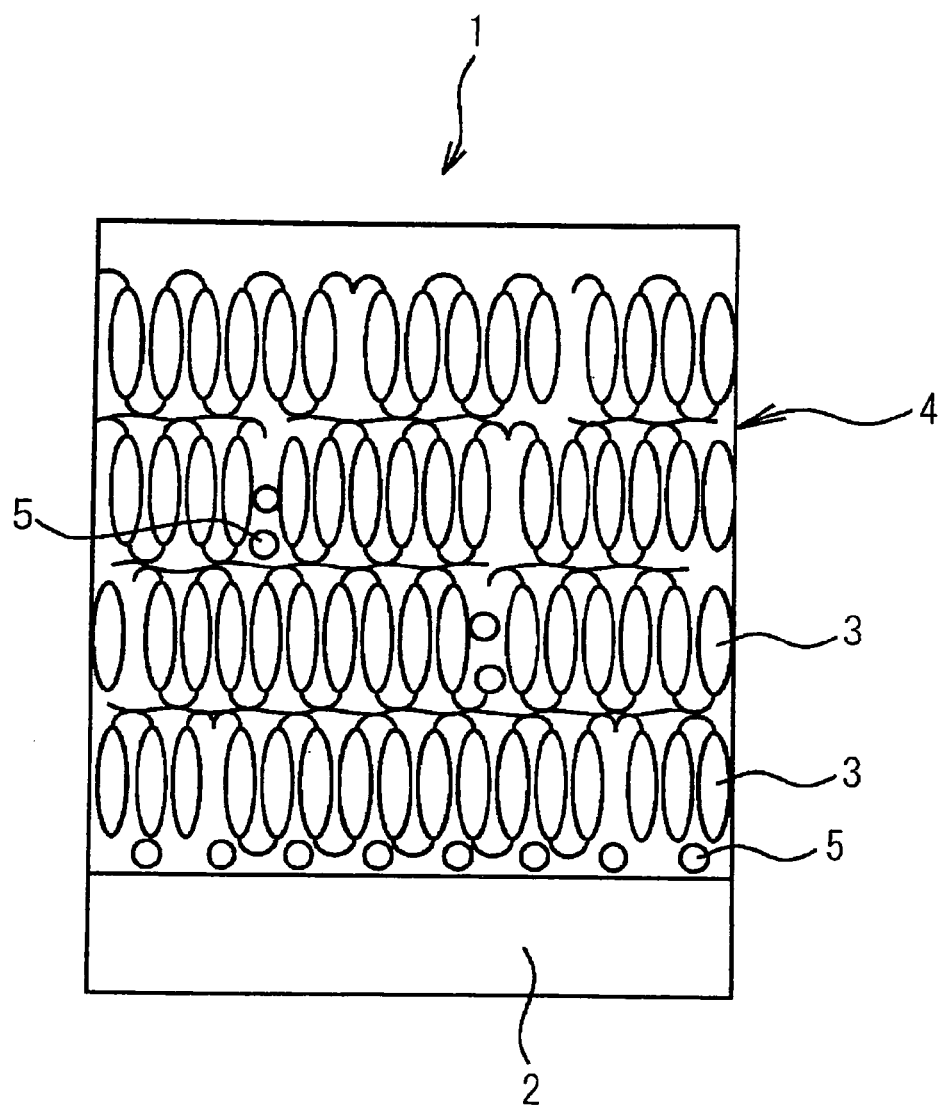

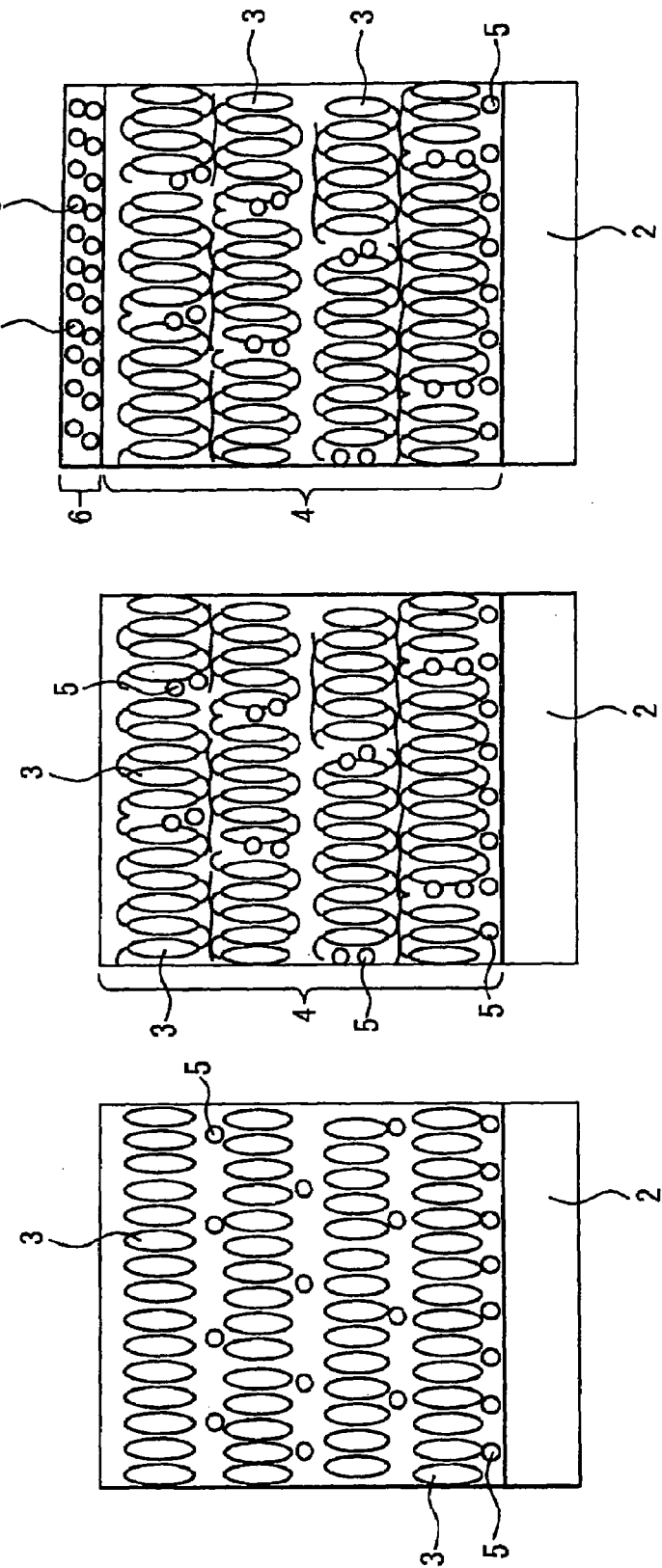

[FIG. 3]
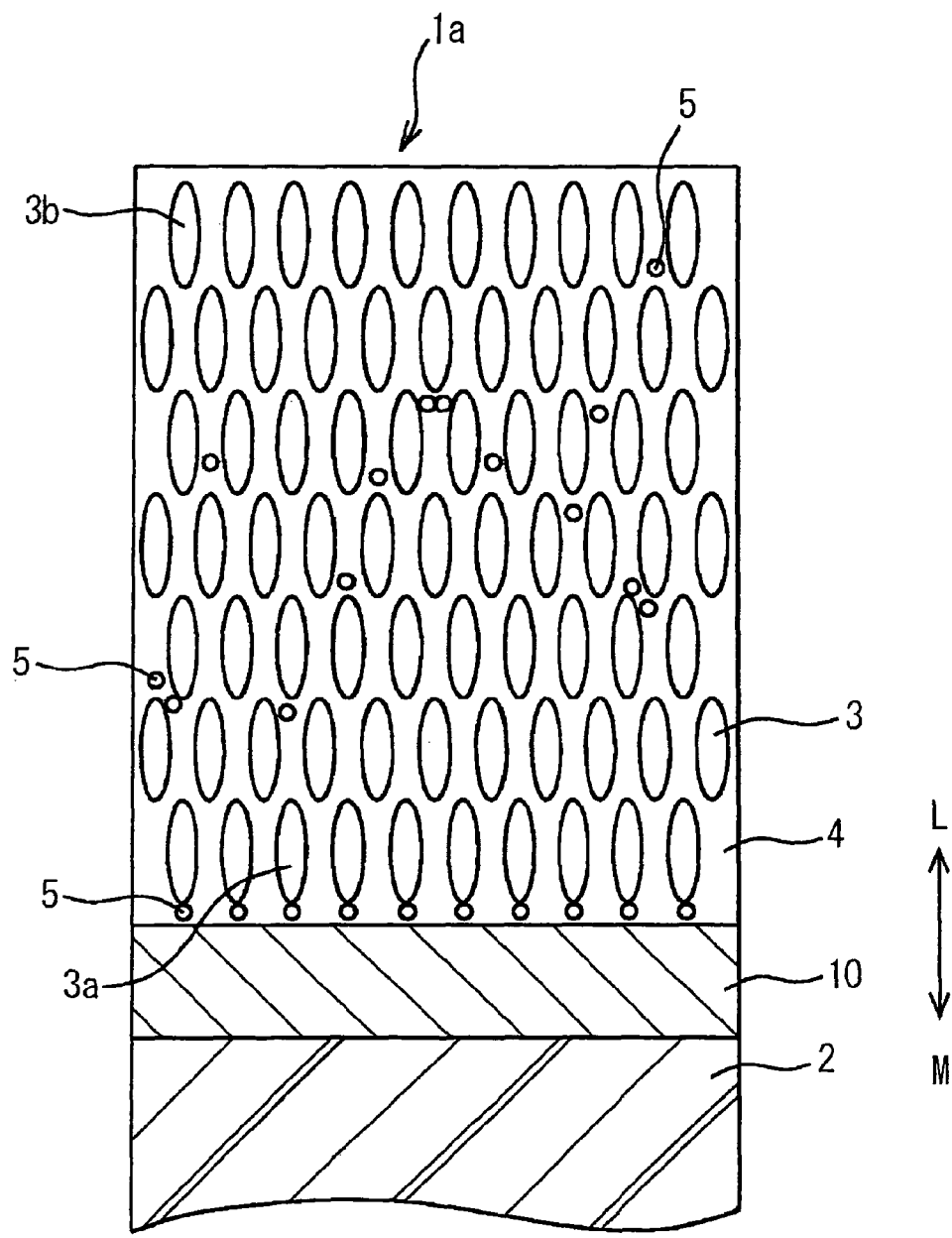

[FIG. 4A]
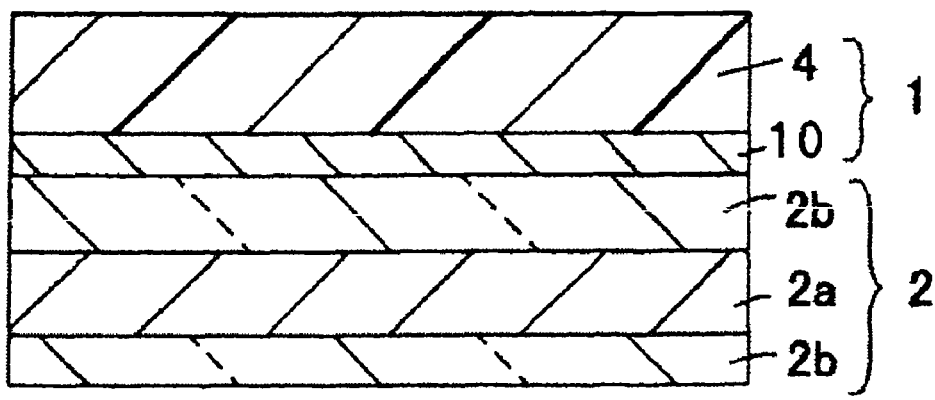
[FIG. 4B]
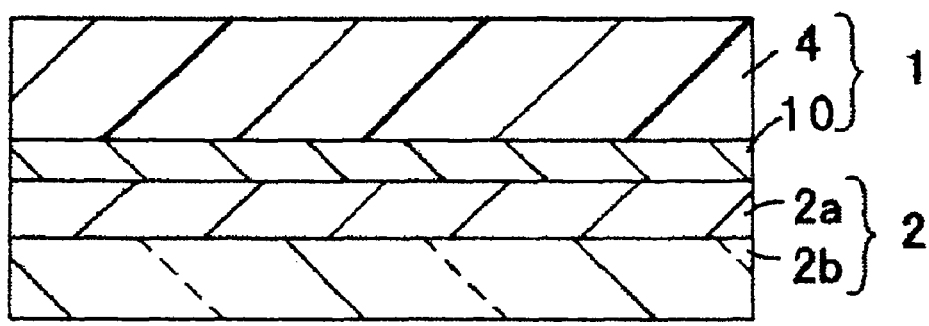

[FIG. 5]
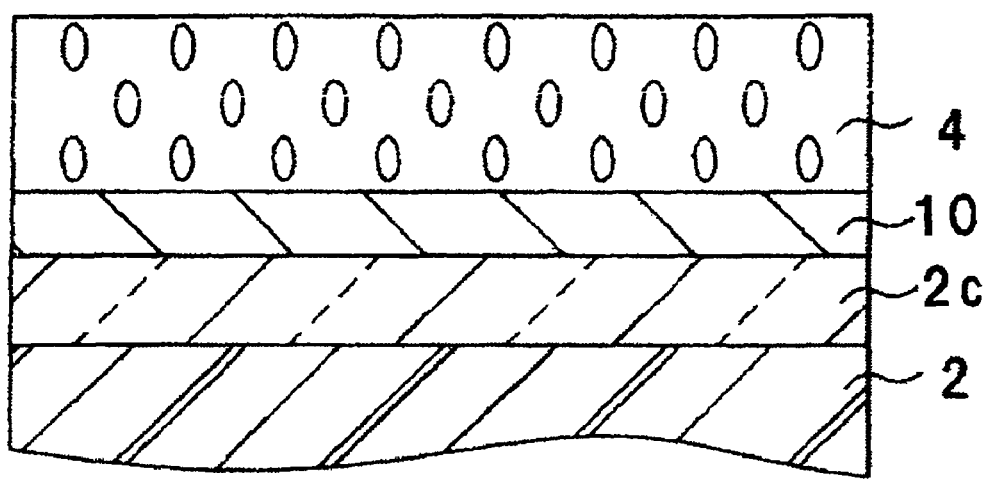

[FIG. 6A]
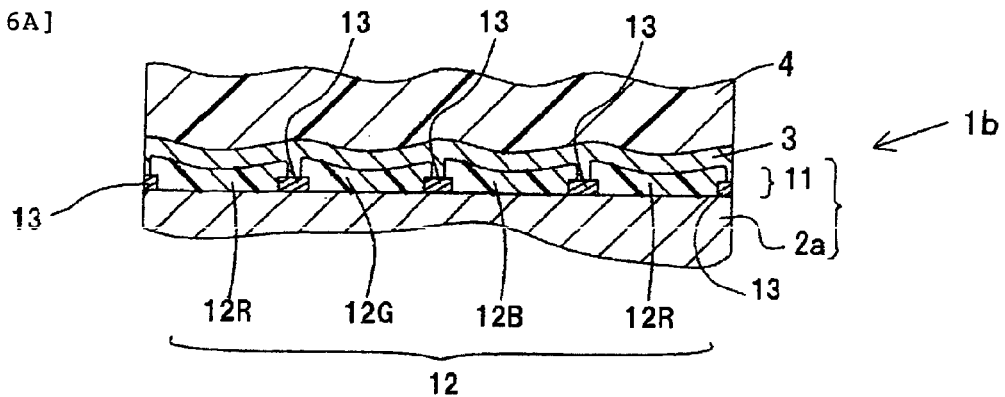
[FIG. 6B]
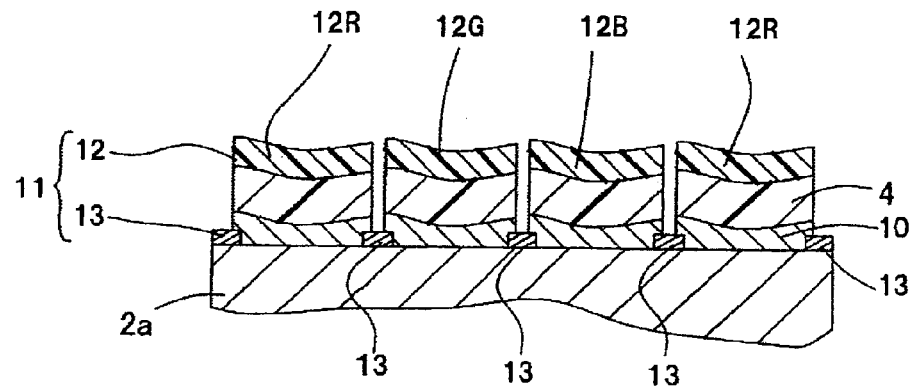
[FIG. 6C]
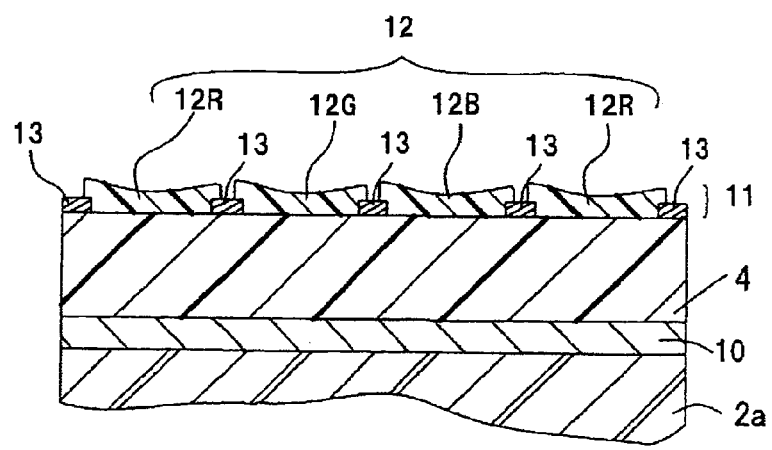

[FIG. 7A]
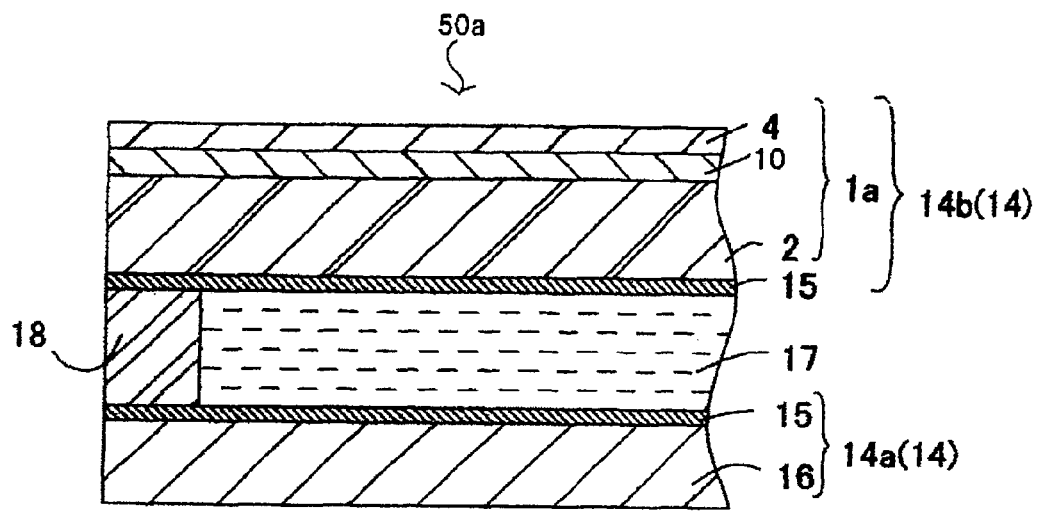
[FIG. 7B]
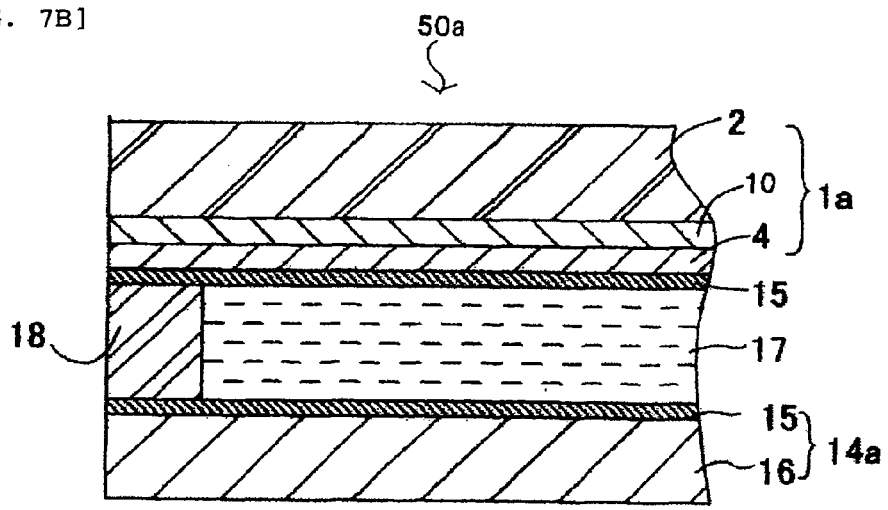

[FIG. 8]
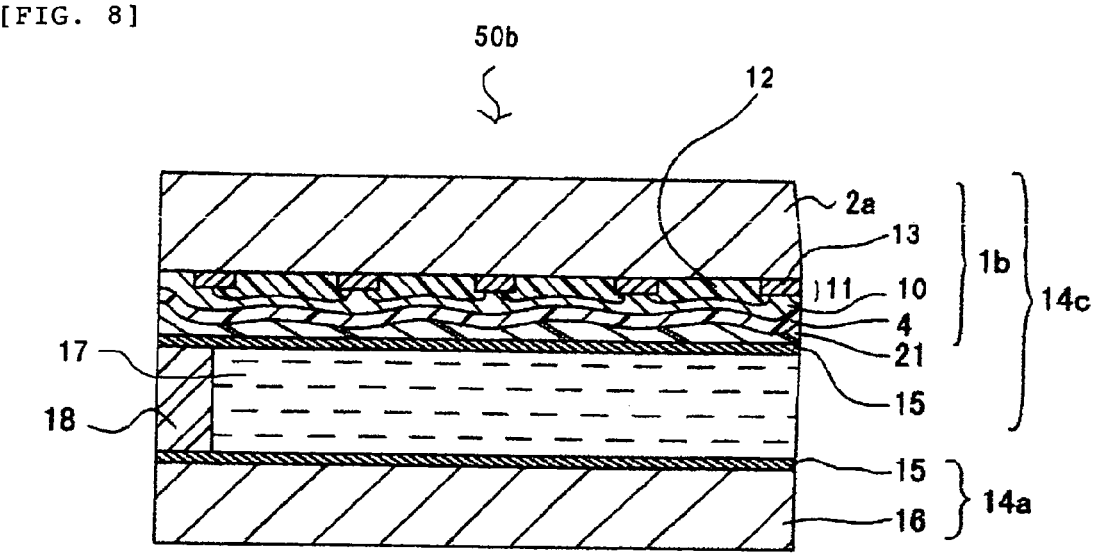

[FIG. 9A]
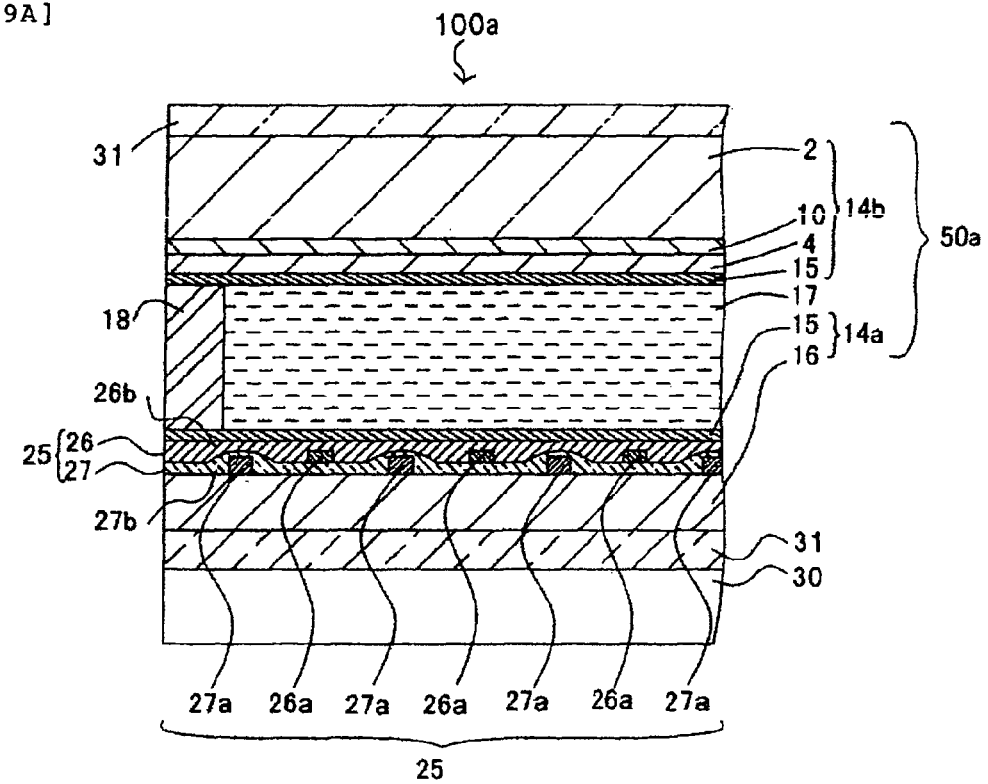
[FIG. 9B]
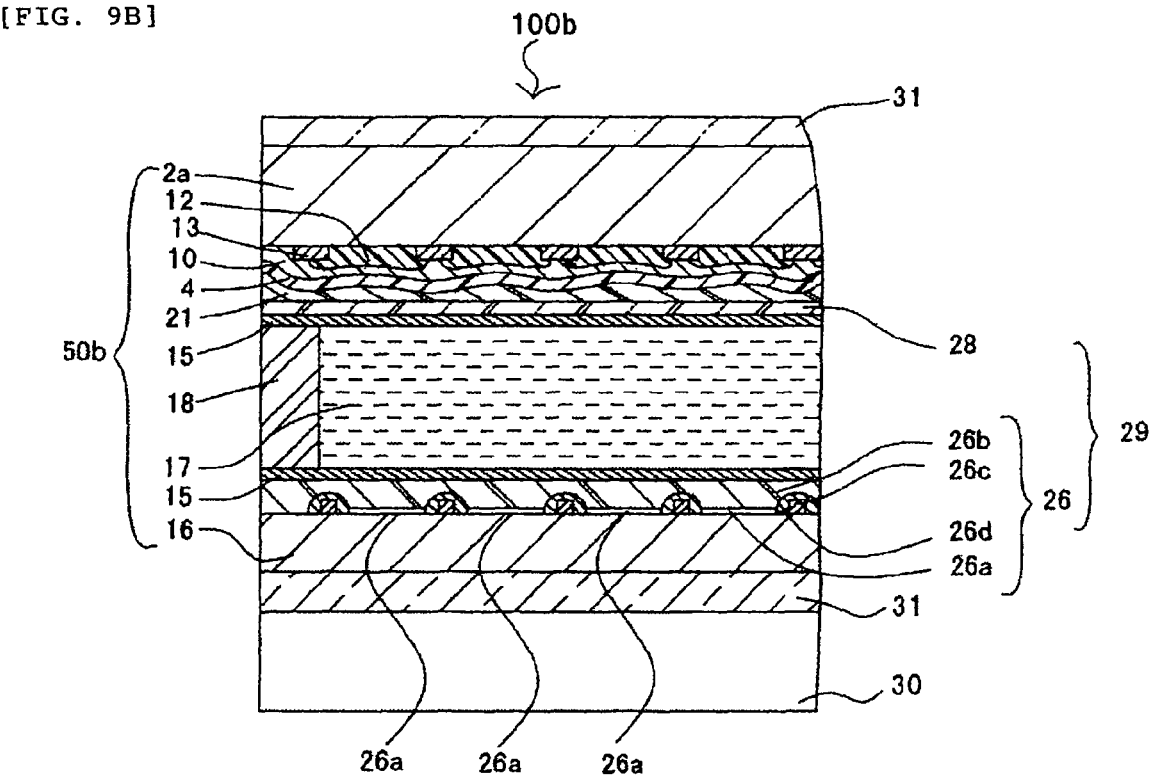

OPTICAL ELEMENT OBTAINED BY HOMEOTROPICALLY ORIENTING LIQUID CRYSTAL MOLECULE, MEMBER FOR LIQUID CRYSTAL DISPLAY DEVICE USING THE SAME, AND LIQUID CRYSTAL DISPLAY DEVICE

CROSS-REFERENCE TO RELATED APPLICATIONS

This is a Continuation of application Ser. No. 11/408,936 filed Apr. 24, 2006, which in turn claims priority to JP 2005-133614 filed Apr. 28, 2005. The disclosures of the prior applications are hereby incorporated by reference herein in their entirety.

BACKGROUND OF THE INVENTION

1. Field of the Invention

The present invention relates to an optical element having a birefringence functional layer. More specifically, the present invention relates to an optical element having a birefringence functional layer including a birefringence layer obtained by orienting and fixing a liquid crystal molecule, a member for a liquid crystal display device using the optical element, and liquid crystal display device.

2. Description of the Related Art

A liquid crystal display device has found use in a variety of fields such as a television and medical equipment because the device has such advantages that the thickness and the weight of the device can be readily reduced, power consumption can be reduced, and a flicker hardly occurs. On the other hand, the device involves a problem which causes light leak or a tone reversal phenomenon depending on the angle at which a user views a liquid crystal display screen, that is, a problem referred to as a narrow viewing angle.

In order to solve the problem, there has been proposed a liquid crystal display device provided with an optical element that controls an outgoing light emitted from a liquid crystal cell and an incident light entered into the liquid crystal cell.

For such the liquid crystal display device, there has been proposed an optical element having a film obtained by orienting and fixing a liquid crystal molecule in a specific direction as well as a film obtained by subjecting a triacetylcellulose (TAC) film to uniaxial stretching or biaxial stretching.

JP 05-142531 A proposes a viewing angle compensation film composed of a nematic liquid crystal polymer whose molecular chain is oriented in a normal direction of the film surface and which has a positive intrinsic refractive index. JP05-142531 A discloses that the viewing angle compensation film may be obtained by: forming a vertical alignment layer on the surface of a glass substrate or the like by using an alkylsilicone-based or fluoroalkylsilicone-based surface treating agent to produce a cell; sealing liquid crystal molecules into the cell; and subjecting the liquid crystal molecules to photopolymerization.

JP2002-174724 A proposes a method of producing a liquid crystal layer in which a polymerizable liquid crystal compound is homeotropically oriented, the method involving applying the liquid crystal compound to a vertical alignment layer formed on a substrate. The method involves the use of a long-chain alkyl-type dendrimer derivative as an agent for forming a vertical alignment layer. In addition, JP 2002-174724 A discloses that a film including a homeotropically oriented liquid crystal film can be obtained by means of the method, and that the film can be used for an optical film such as a retardation film.

JP 2002-174725 A proposes a method of producing a homeotropically oriented liquid crystal film involving: applying, to a substrate provided with no vertical alignment layer, a side-chain type liquid crystal polymer containing a monomer unit containing a liquid crystal fragment side chain and a monomer unit containing a non-liquid crystal fragment side chain; further homeotropically orienting the liquid crystal polymer in a liquid crystal state; and fixing the polymer while the oriented state is maintained.

JP 2003-121852 A proposes a method of producing a homeotropically oriented liquid crystal film involving: forming, on a substrate provided with no vertical alignment layer, a binder layer and an anchor coat layer in the stated order from the side of the substrate; applying a side-chain type liquid crystal polymer to the anchor coat layer for homeotropic orientation; and fixing the polymer while the homeotropically oriented state is maintained. The method involves the use of a polymer as a side-chain type liquid crystal polymer capable of forming a homeotropically oriented liquid crystal layer on a substrate provided with no vertical alignment layer.

SUMMARY OF THE INVENTION

However, the viewing angle compensation film of JP 05-142531 A is obtained after a series of steps of: producing a cell by means of two substrates each having an alignment layer; sealing liquid crystal molecules into the empty cell; vertically orienting the liquid crystal molecules; and subjecting the liquid crystal molecules to photopolymerization while maintaining the oriented state of each of the molecules. The viewing angle compensation film of JP05-142531 A has a problem in that a production cost significantly increases because the film is obtained through a large number of production steps as described above.

The method of JP 2002-174724 A requires the use of a special material called a long-chain alkyl-type dendrimer derivative upon production of a homeotropically oriented liquid crystal layer through the arrangement of a vertical alignment layer on a substrate. When a homeotropically oriented liquid crystal layer is obtained by means of the method, there arises a problem in that a production cost significantly increases.

A homeotropically oriented liquid crystal film obtained by means of the method described in JP 2002-174725 A is composed of a side-chain type liquid crystal polymer. Even when the polymer is fixed in a homeotropically oriented state, its flowability increases with increasing temperature, and birefringence property is apt to be influenced by heat. Therefore, the temperature range in which desired birefringence property can be maintained is relatively narrow, and the orientation of a liquid crystal polymer in a part where the liquid crystal polymer is fixed is apt to be nonuniform. In this case, it is difficult to use a homeotropically oriented liquid crystal film obtained by means of the method for a liquid crystal display device requested to have high heat resistance, so the number of liquid crystal display devices each of which is capable of using the liquid crystal film is limited.

In addition, when a homeotropically oriented liquid crystal film obtained by means of the method is used for a liquid crystal display device, attention must be paid in such a manner that the film is not placed in a high-temperature environment, so it is difficult to arrange the film inside the liquid crystal display device. Therefore, a homeotropically oriented liquid crystal film obtained by means of the method of JP 2002-174725 A has a problem in that the number of positions where the film can be installed in a liquid crystal cell is limited.

A homeotropically oriented liquid crystal film obtained by means of the method described in JP 2003-121852 A is composed of a side-chain type liquid crystal polymer, so the method has a problem similar to that of the method described in JP 2002-174725 A described above.

In order to solve the above problems, in an optical element having a birefringence layer composed of a liquid crystal polymer layer with fixed orientation, the inventors of the present invention have found that a low cost and good heat resistance can be obtained, and a wide viewing angle can be compensated when the birefringence layer is formed by: fixing the orientation of a liquid crystal polymer layer oriented by means of a liquid crystal composition containing a crosslinkable, polymerizable liquid crystal monomer and an additive for promoting the homeotropic orientation of the monomer. However, the finding has been susceptible to improvement in that an optical element showing a low haze with reliability and capable of realizing high contrast with reliability when the optical element is used for a liquid crystal display device is provided.

The present invention has been made with a view to solving the above problems, and an object of the present invention is to provide an optical element which: can suppress a production cost; has good heat resistance; uniformly maintains the fixed orientation of a liquid crystal polymer in a wide temperature range; shows a low haze, to be specific, a haze of 0.1 or less with reliability; and can maintain desired birefringence property with reliability. Another object of the present invention is to provide an optical element capable of: maintaining the fixed orientation of a liquid crystal molecule in a sufficiently uniform state when the optical element installed in a liquid crystal display device; and realizing high contrast with reliability. Another object of the present invention is to provide a liquid crystal display device having a wide viewing angle.

That is, the gist of the present invention is as follows:

(1) An optical element including: a base material having light transmittance; and a birefringence functional layer including at least a birefringence layer, wherein: the birefringence layer has a structure obtained by fixing liquid crystal monomers each having a polymerizable group at a terminal thereof in a state where the monomers are homeotropically oriented; the birefringence layer contains an additive for promoting the homeotropic orientation of the liquid crystal monomer; and no additive layer constituted by the additive is present on the upper surface of the birefringence layer;

(2) An optical element according to item (1), wherein the birefringence functional layer consists of a vertical alignment layer formed on an upper surface of the base material and the birefringence layer formed on an upper surface of the vertical alignment layer;

(3) An optical element according to item (2), wherein at least one component for promoting homeotropic orientation of a liquid crystal monomer in the vertical alignment layer is used for the additive;

(4) An optical element according to item (1), wherein the liquid crystal monomers constituting the birefringence layer are oriented while showing a substantially uniform tilt angle;

(5) An optical element according to item (1), wherein a coloring layer is formed on one of a position between the base material and the birefringence functional layer and a position on an upper surface of the birefringence functional layer;

(6) A member for a liquid crystal display device including: two laminated structures each including a layer having light transmittance; and a liquid crystal layer in which liquid crystal is sealed, the liquid crystal layer being interposed between the two laminated structures, wherein the optical element according to item (1) is formed in at least one of the laminated structures;

(7) A member for a liquid crystal display device according to item (6), wherein the birefringence layer in the optical element is formed to be positioned on a side of the liquid crystal layer in the member for a liquid crystal display device;

(8) A liquid crystal display device having a multilayer structure, the device including: polarizing plates with liquid crystal interposed therebetween; and a layer composed of an electrode portion for changing orientation of a liquid crystal layer through application of a voltage, wherein the member for a liquid crystal display device according to item (6) is used; and (9) A liquid crystal display device having a multilayer structure, the device including: polarizing plates with liquid crystal interposed therebetween; and a layer composed of an electrode portion for changing orientation of a liquid crystal layer through application of a voltage, wherein the member for a liquid crystal display device according to item (7) is used.

According to the optical element of the present invention, upon formation of a birefringence layer, liquid crystal monomers constituting the birefringence layer are vertically oriented through the addition of an additive for promoting the homeotropic orientation of the monomer, so not only a liquid crystal monomer close to the side of a substrate but also a liquid crystal monomer apart from the substrate can be homeotropically oriented favorably and uniformly. Therefore, an optical element having a birefringence layer forming, in the thickness direction of the birefringence layer, a state where liquid crystal is homeotropically oriented with improved uniformity can be obtained. The above-described optical element of the present invention can be used as an element for controlling the polarized state of light such as an element for controlling a phase difference or an optical compensation element. In addition, the optical element can impart a phase difference control function with improved finesse because the uniformity of orientation is improved.

In addition, the above liquid crystal monomers are polymerizable, so a birefringence layer can be formed of a liquid crystal polymer obtained by crosslinking the liquid crystal monomers that have been homeotropically oriented. The optical element of the present invention including a birefringence layer having the above crosslinked structure can be used even for an optical instrument to be used in an environment where a temperature is relatively apt to be high such as the inside of a vehicle because the optical element has high heat resistance and its birefringence property is hardly influenced by heat. Furthermore, the optical element can be arranged even in a liquid crystal panel installed in an optical instrument because the optical element has relatively high heat resistance. In particular, according to the present invention in which the above crosslinked structure is a three-dimensional crosslinked structure, the above effects can be obtained with improved significance.

Furthermore, in the birefringence layer in the present invention, an additive layer to be formed on the surface of the birefringence layer (that is, a surface opposite to the side of a substrate in the birefringence layer) is removed, so the optical element of the present invention including the birefringence layer can reduce a haze to 0.1 or less with reliability. As a result, a phase difference can be controlled with improved favorableness, and a degree of transparency can be increased.

The above optical element can be laminated and formed integrally on a member constituting a liquid crystal panel, and an optical instrument can be designed without the separate arrangement of any member (phase difference control member) such as a film for controlling a phase difference. Separately arranging a phase difference control member requires the fixing of the member by means of an adhesive or the like. However, the optical element of the present invention can eliminate the need for such adhesive, and can reduce the possibility of, for example, the scattering of light due to an adhesive.

When the optical element of the present invention is provided with a coloring layer, and the resultant is used for a liquid crystal display device, the need to arrange a phase difference control member separate from a member having the coloring layer is eliminated, so the thickness of the liquid crystal display device can be reduced.

The production cost of the optical element of the present invention can be easily suppressed because the birefringence layer can be formed through a relatively easy process involving: applying, to the upper surface of a base material or the upper surface of a vertical alignment layer formed by applying a composition liquid for the upper film of the base material, a birefringence layer composition liquid; orienting liquid crystal; and crosslinking the liquid crystal.

A member for a liquid crystal display device using the optical element can improve a phase difference control function, and a liquid crystal display device provided with the characteristics of the optical element such as a reduction in possibility of light scattering due to an adhesive can be produced by means of the member.

In addition, the thickness of a liquid crystal display device using the optical element can be reduced as compared to that of a liquid crystal display device formed by means of a conventional optical compensation film. In addition, the liquid crystal display device can effectively utilize light, has good contrast, and can provide a wide viewing angle.

BRIEF DESCRIPTION OF THE DRAWINGS

In the accompanying drawings:

FIG. 1 is a conceptual view for explaining an optical element of the present invention;

FIG. 2A is a conceptual view showing a state where a resin composition containing liquid crystal monomers and an additive is applied to the upper surface of a substrate so that the liquid crystal monomers are homeotropically oriented, FIG. 2B is a conceptual view showing a state where the homeotropically oriented liquid crystal monomers are three-dimensionally crosslinked, and FIG. 2C is a conceptual view showing the fact that an additive layer is formed on a surface by baking a birefringence layer;

FIG. 3 is a schematic view showing the sectional structure of the optical element of the present invention;

FIG. 4A is a schematic view showing the sectional structure of an optical element obtained by providing a substrate with a functional layer and FIG. 4B is a schematic view showing the sectional structure of another example of the optical element obtained by providing a substrate with a functional layer;

FIG. 5 is a schematic view showing the sectional structure of the optical element on which an additional functional layer is laminated;

FIG. 6A is a schematic view showing the sectional structure of an optical element provided with a coloring layer, FIG. 6B is a schematic view showing the sectional structure of another example of the optical element provided with a coloring layer, and FIG. 6C is a schematic view showing another example of the sectional structure of the optical element provided with a coloring layer;

FIG. 7A is a schematic view showing a member for a liquid crystal display device provided with an optical element of a first embodiment and FIG. 7B is a schematic view showing a member for a liquid crystal display device having the optical element of the first embodiment formed in such a manner that a birefringence layer is positioned between a substrate and a liquid crystal layer;

FIG. 8 is a schematic view showing a member for a liquid crystal display device provided with an optical element of a third embodiment; and FIG. 9A is a schematic view showing a liquid crystal display device of a first embodiment and FIG. 9B is a schematic view showing a liquid crystal display device of a second embodiment.

DESCRIPTION OF THE PREFERRED EMBODIMENTS

Hereinafter, the best mode for carrying out the present invention will be described with reference to the drawings.

FIG. 1 is a conceptual view showing an optical element 1 of the present invention. The optical element 1 is formed of: a base material 2; a birefringence layer 4 on the upper surface of the base material 2, the birefringence layer 4 being obtained by three-dimensionally crosslinking homeotropically oriented liquid crystal monomers 3 and by fixing the orientation. The birefringence layer 4 contains an additive 5 for promoting the homeotropic orientation of the liquid crystal monomers, and the additive is present at an interface between the base material 2 and any one of the liquid crystal monomers 3, or is present between the two adjacent liquid crystal monomers 3. The birefringence functional layer in the optical element 1 shown in FIG. 1 is formed only of the birefringence layer 4. However, as described later, the birefringence functional layer in the present invention is not limited thereto, and may be constituted by a vertical alignment layer and a birefringence layer.

A process for forming the optical element 1 will be schematically explained. At first, as shown in FIG. 2A, a birefringence layer composition liquid containing the liquid crystal monomers 3 that can be three-dimensionally crosslinked and the additive 5 is applied to the base material 2 so that the liquid crystal monomers 3 are homeotropically oriented on the base material 2. Next, for example, active radiation is applied so that the liquid crystal monomers 3 are three-dimensionally crosslinked as shown in FIG. 2B and the homeotropically oriented liquid crystal monomers 3 are fixed on the base material 2. At this time, the additive 5 is present at an interface between the base material 2 and any one of the liquid crystal monomers 3, or is present between the two adjacent liquid crystal monomers 3. After that, when the formed article obtained in FIG. 2B is baked for improving the heat resistance and adhesiveness of the birefringence layer 4, an additive layer 6 is formed on the surface of the birefringence layer 4 as a result of aggregation of the additive 5 as shown in FIG. 2C. In addition, the additive layer 6 is estimated to be formed as a result of bleeding of part of the additive 5 present between the monomers 3 to the surface of the birefringence layer through baking because the additive layer 6 has a small specific gravity of the additive 5.

The inventors of the present invention have found that the presence of the additive layer 6 is responsible for an increase in haze of an optical element, and reduces the desired phase difference control function in the birefringence layer 4. On the basis of the finding, they have completed the optical element 1 including the birefringence layer 4 from which the additive layer 6 has been removed. The additive layer 6 can be removed by means of a generally known method such as abrasion or etching. The presence of the additive layer 6 can be confirmed on the basis of the fact that the surface layer of the optical element is whitish. Therefore, the removal of the additive layer 6 can be confirmed by removing the whitish surface layer by means of, for example, abrasion. Alternatively, the following procedure may be adopted. That is, the thickness of the additive layer is determined depending on the design of the optical element and a production condition such as the dose of active radiation or a baking treatment. Therefore, in an optical element to be produced on the basis of desirable design and under a desirable production condition, the thickness of an additive layer to be formed is measured in advance, and the surface of the optical element is deleted by means of, for example, abrasion or etching by the thickness so that the additive layer is removed.

Hereinafter, the optical element of the present invention will be described in more detail.

An optical element 1a of the present invention shown in FIG. 3 is constituted by positioning the base material 2 having light transmittance, a vertical alignment layer 10, the birefringence layer 4 having the additive 5 therein in the stated order. In the optical element 1a, a birefringence functional layer is constituted by the vertical alignment layer 10 and the birefringence layer 4. However, the birefringence functional layer in the present invention is not limited thereto. When the additive 5 promotes the homeotropic orientation of each of the liquid crystal monomers 3 sufficiently, a vertical alignment layer is not always formed.

The base material 2 includes a layer composed of a substrate 2a having light transmittance. The base material may be constituted by a structure composed of a single substrate layer, may be constituted by a multilayer structure obtained by superimposing a large number of substrates 2a, or may be constituted by laminating a functional layer 2b provided with a predetermined function on the layer composed of the substrate 2a. For example, the base material 2 may be constituted by forming the functional layer 2b on each surface of the substrate 2a (FIG. 4A), may be constituted by forming the functional layer 2b on one surface of the substrate 2a (FIG. 4B), or may be constituted by forming the functional layer 2b inside the substrate 2a (not shown).

The present invention shown in each of FIGS. 4 to 9 omits the description about an additive present in the birefringence layer 4 for convenience.

An optically isotropic substrate is preferably used for the substrate 2a. A substrate partially provided with a light-shielding region or the like is also available. In addition, the light transmittance of the substrate 2a can be appropriately selected. To be specific, a plate, sheet, or film formed of a transparent, inorganic material or transparent, organic material can be used.

Examples of the transparent, inorganic material include glass, silicon, and quartz. Of those, quartz is preferable because it has small thermal expansibility, good dimensional stability, and excellent workability in a high-temperature heating treatment. In particular, when a color filter of the present invention is used for a liquid crystal display, no-alkali glass free of any alkali component in the glass is preferably used for a substrate.

Meanwhile, an example of the transparent organic material can include one made of: acryl such as polymethylmethacrylate; polyamide, polyacetal, polybutylene terephthalate, polyethylene terephthalate, polyethylene naphthalate, triacetyl cellulose, or syndiotactic/polystyrene; polyphenylene sulfide, polyether ketone, polyetherether ketone, a fluororesin, or polyether nitrile; polycarbonate, a modified polyphenylene ether, polycyclohexene, or a polynorbornene-based resin; or polysulphone, polyethersulphone, polyacrylate, polyamide imide, polyether imide, or thermoplastic polyimide. In addition, one made of a common plastic can be used. In particular, a uniaxial oriented film or a biaxial oriented film, a TAC film having retardation in plane, or the like can be used as a film. The thickness of the substrate 10 is not particularly limited, but the thickness is generally near 0.05 mm to 1.5 mm depending on applications.

The functional layer 2b is a layer having a function of changing the state of light, and differs from the birefringence layer 4. Specific examples of the functional layer include: a horizontal alignment layer in which a liquid crystal molecule is horizontally oriented; a vertical alignment layer in which a liquid crystal molecule is vertically oriented; a coloring layer; a reflecting plate for reflecting light; and a polarizing plate. In addition, the functional layer 2b may be not only arranged on the entire surface of the substrate 2a, but also partially on the surface of the substrate 2a.

The vertical alignment layer 10 is formed by means of a liquid containing a component for promoting the homeotropic orientation of a liquid crystal monomer such as soluble polyimide, polyamic acid, a surfactant, a coupling agent, or a combination of them as a layer composition liquid by: applying the layer composition liquid by means of a method such as flexographic printing or spin coating; and curing the applied liquid.

The thickness of the vertical alignment layer 10 is preferably in the range of about 0.01 to 1 μm. A thickness of the vertical alignment layer 10 of less than 0.01 μm may make it difficult to homeotropically orient liquid crystal. In addition, a thickness of the vertical alignment layer 10 in excess of 1 μm may cause the vertical alignment layer 10 itself to irregularly reflect light to significantly reduce the light transmittance of the optical element.

Specific examples of the layer composition liquid containing soluble polyimide, polyamic acid, or the like include: SE-7511 and SE-1211 manufactured by NISSAN CHEMICAL INDUSTRIES, LTD.; and JALS-2021-R2 manufactured by JSR.

Polyimide having a long-chain alkyl group is preferably used for forming the vertical alignment layer 10 because the thickness of the birefringence layer 4 formed in the optical element can be selected from a wide range.

When the vertical alignment layer 10 is formed by means of a layer composition liquid containing a surfactant and/or a coupling agent, the surfactant has only to be capable of homeotropically orienting polymerizable liquid crystal having a rod-like molecular shape; provided, however, that a surfactant or coupling agent of which a vertical alignment layer to be heated together with the birefringence layer is formed must have such heat resistance that it is not decomposed even at the transition temperature at which liquid crystal undergoes a transition to a liquid crystal phase because the liquid crystal must be heated to the transition temperature upon formation of the birefringence layer. In addition, a surfactant or coupling agent of which a vertical alignment layer to be in contact with the birefringence layer is formed preferably has a high affinity for an organic solvent into which liquid crystal is dissolved because the liquid crystal is dissolved into the organic solvent upon formation of the birefringence layer. The surfactant may be a nonionic surfactant, a cationic surfactant, an anionic surfactant, or any other surfactant without any limitation as long as such condition as described above is satisfied. Only a single kind of surfactant may be used, or multiple kinds of surfactants may be used in combination. As in the case of the surfactant, the kind of the coupling agent is not limited, and multiple kinds of coupling agents may be used in combination.

Examples of the surfactant can include (a) a surfactant having an alkyl chain or long alkyl side chain, (b) a surfactant having an alkyl chain or long alkyl side chain at least part of which is substituted by fluorine, and (c) a surfactant having a side chain containing a fluorine atom. In particular, a surfactant having strong water repellency or strong oil repellency is preferably used for homeotropically orienting polymerizable liquid crystal even when the thickness of the birefringence layer 4 is increased.

Specific examples of the surfactant having strong water repellency or oil repellency include (i) lecithin, (ii) octadecyldimethyl(3-trimethoxysilylpropyl)ammonium chloride, (iii) hexadecyl amine, (iv) ADEKAMINE 4DAC-85 (trade name of a surfactant manufactured by Asahi Denka Co., Ltd.), (v) DRYPON 600E (trade name of a surfactant manufactured by NICCA CHEMICAL), (vi) DRYPON Z-7 (trade name of a surfactant manufactured by NICCA CHEMICAL), and (vii) NK Guard NDN-7E (trade name of a surfactant manufactured by NICCA CHEMICAL).

A specific example of the coupling agent includes a silane-coupling agent obtained by hydrolyzing a silane compound such as n-octyltrimethoxysilane, n-octyltriethoxysilane, decyltrimethoxysilane, decyltriethoxysilane, n-dodecyltrimethoxysilane, n-dodecyltriethoxysilane, octadecyltrimethoxysilane, or octadecyltriethoxysilane.

In particular, a coupling agent which strongly homeotropically orients liquid crystal molecules of the birefringence layer 4 can include a fluorine-based silane coupling agent.

A specific example of the coupling agent includes a fluorine-based silane coupling agent obtained by hydrolyzing a fluorine-based silane compound such as perfluoroalkylsilane, pentafluoroalkylsilane, pentafluorophenyl trimethoxysilane, pentafluorophenyl triethoxysilane, pentafluoropheylpropyl trimethoxysilane, pentafluorophenylpropyl triethoxysilane, trifluoropropyl trimethoxysilane, trifluoropropyl triethoxysilane, 1H,1H,2H,2H,-perfluorodecyl trimethoxysilane, 1H,1H,2H,2H,-perfluorodecyl triethoxysilane, 1H,1H,2H,2H,-perfluoroocyl trimethoxysilane, 1H,1H,2H,2H,-perfluoroocyl triethoxysilane, 3-(peptafluoroisopropoxy)propyl trimethoxysilane, or 3-(peptafluoroisopropoxy)propyl triethoxysilane.

Next, the birefringence layer 4 will be described. As shown in FIG. 3, the birefringence layer 4 is formed to have a crosslinked polymer structure obtained by crosslinking the liquid crystal monomers 3 each having a slightly elongated molecular shape in a state where the monomers are homeotropically oriented.

A bonding hand showing a state where the liquid crystal monomers 3 are bound to each other is not shown in any one of FIGS. 3 and 5 for convenience.

In the birefringence layer 4, the additive 5 is present at an interface between any one of the liquid crystal monomers 3 and the vertical alignment layer 10 (or the base material 2 when the vertical alignment layer 10 is not formed), and is present between the two adjacent liquid crystal monomers 3. The above-described component for promoting the homeotropic orientation of a liquid crystal polymer such as polyimide, a surfactant, a coupling agent, or a combination of them can be used as the additive 5. The additive 5 can be arbitrarily selected from the group consisting of polyimide, a surfactant, a coupling agent, and a combination of them when a birefringence functional layer is formed only of the birefringence layer 4 without the formation of the vertical alignment layer 10. On the other hand, the same component as a component constituting the vertical alignment layer 10 (that is, polyimide, a surfactant, a coupling agent, or a combination of them) can be used for the additive 5 when a birefringence functional layer is formed by forming the vertical alignment layer 10 and by forming the birefringence layer 4 after the formation of the layer 10.

The degree of crosslinking of the liquid crystal monomers 3 of the birefringence layer 4 is preferably about 80 or more, or more preferably about 90 or more. A degree of crosslinking of the liquid crystal monomers of less than 80 may be unable to maintain uniform orientation sufficiently.

In the birefringence layer 4, the tilt angles of the liquid crystal monomers 3 each serving as a unit constituting a crosslinked polymer structure are desirably such that the tilt angle of a liquid crystal (for example, a liquid crystal monomer 3a) molecule at the position closest to a boundary between the birefringence layer 4 and the vertical alignment layer 10 and the tilt angle of a liquid crystal (for example, a liquid crystal monomer 3b) molecule at the position most distant from the above liquid crystal molecule in the thickness direction (the direction along arrows L and M) of the birefringence layer are substantially equal to each other (see FIG. 3). In this case, the tilt angles of the respective liquid crystal monomers 3 in the birefringence layer 4 are substantially uniform in the thickness direction. As a result, uniform homeotropic orientation can be obtained in the birefringence layer 4. Furthermore, the tilt angles of the liquid crystal monomers 3 in the birefringence layer 4 are more preferably made equal to each other in the thickness direction. In particular, the tilt angles of the respective liquid crystal monomers 3 constituting the birefringence layer 4 can be made substantially equal to each other because the birefringence layer 4 has the additive 5 for promoting the homeotropic orientation of each of the liquid crystal monomers 3.

The birefringence layer 4 provides light to be incident on the birefringence layer 4 (incident light) with retardation in association with the anisotropy of the refractive index of each of the liquid crystal monomers 3 constituting the layer 4. The retardation is an optical path difference between ordinary light and extraordinary light occurring in the incident light. The magnitude of the retardation is represented as the product of birefringence $\Delta n$ (a difference between the refractive index no of the ordinary light and the refractive index ne of the extraordinary light) and the thickness d of the birefringence layer 4. Therefore, from the viewpoint of the fact that the retardation and orientation property of the birefringence layer 4 are determined by the birefringence $\Delta n$ and the thickness, the birefringence $\Delta n$ is preferably about 0.03 to 0.20, or more preferably about 0.05 to 0.15. An of less than 0.03 requires an increase in thickness of a phase difference control functional layer in order that sufficient retardation may be obtained. An excessively large thickness may make it impossible for a liquid crystal polymer close to an interface on the side of the air to maintain specified orientation. In addition, the thickness of the phase difference control functional layer is preferably 0.1 µm to 5 µm. A thickness of the phase difference control functional layer of less than 0.1 µm may fail to exert a sufficient phase difference control function. The magnitude of the retardation of the birefringence layer 4 to be obtained as described above is preferably 1 nm or less, more preferably 0.1 nm or less, or ideally zero.

The birefringence can be measured by measuring the retardation and the thickness. Any one of commercially available devices such as KOBRA-21 series (manufactured by Oji Scientific Instruments) can be used for measuring the retardation. A measurement wavelength at the time of measurement is preferably in the visible light range (380 nm to 780 nm), and is more preferably around 550 nm at which relative luminous efficiency is largest. A commercially available device such as a stylus level difference meter DEKTAK (Sloan) can be used for measuring the thickness.

The liquid crystal monomers 3 constituting the birefringence layer 4 can use monomers each liquid crystal state of which can be fixed at room temperature, more specifically, monomers each of which has an unsaturated double bond in its molecular structure and can be crosslinked in a liquid crystal state (including polymerizable liquid crystal). In particular, one having an unsaturated double bond at a terminal of a molecule is used as the polymerizable liquid crystal.

11]. One kind of Compounds (I) exemplified in the formulae [Chem 1] to [Chem 10] or a mixture of two or more kinds of them, one kind of Compounds (II) included in the general chemical formula represented by [Chem 11] or a mixture of two or more kinds of them, or a mixture obtained by combining them can be used as the liquid crystal monomer material that can be used in the present invention. In the case of a liquid crystal monomer included in the general chemical formula [Chem 11], X representing a long alkyl chain positioned at each end of an aromatic ring is preferably 4 to 6 (integer).

[Chem 1]
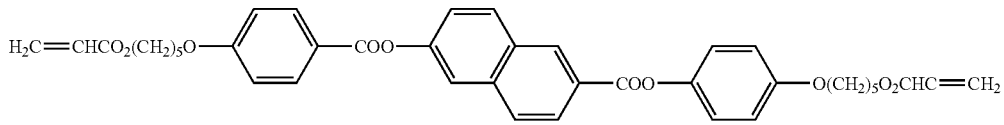

[Chem 2]
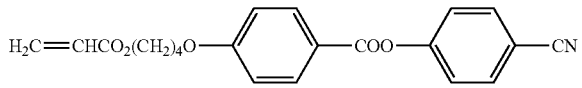

[Chem 3]

[Chem 4]

[Chem 5]

[Chem 6]
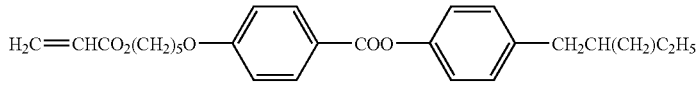

[Chem 7]
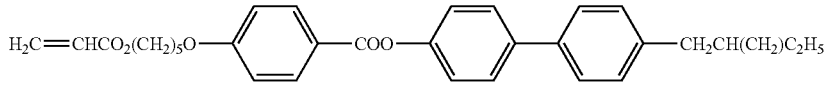

[Chem 8]
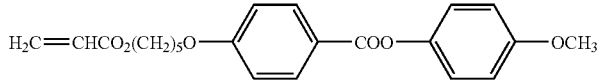

[Chem 9]
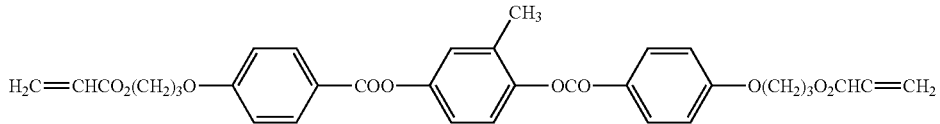

[Chem 10]
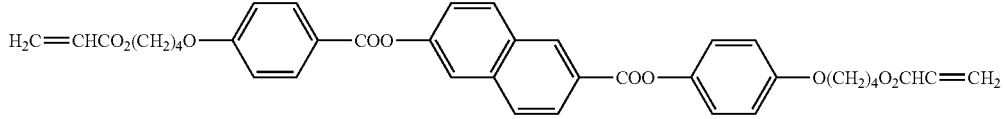

[Chem 11]
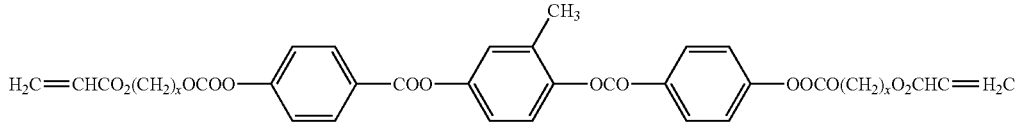

Examples of such crosslinkable liquid crystal monomer material include Compounds (I) exemplified in the following formulae [Chem 1] to [Chem 10] and Compounds (II) included in a general chemical formula represented by [Chem (In the Formula, X Represents an Integer of 4 to 6.)

The birefringence layer 4 in the optical element of the present invention can be formed by: applying, to the vertical alignment layer 10 (or the base material 2), a birefringence layer composition liquid obtained by blending the liquid crystal monomers 3 as described above with a solvent and the additive 5 to form a coating film; homeotropically orienting the liquid crystal monomers in the coating film; and crosslinking the liquid crystal monomers 3 while maintaining the homeotropically oriented state. The birefringence layer 4 may be formed through patterning on the vertical alignment layer 10 by means of any one of various printing methods or a photolithography method. When a birefringence functional layer is formed only of the birefringence layer 4 without the formation of the vertical alignment layer 10, a coating film can be formed by applying the birefringence layer composition liquid directly to the base material 2.

The solvent is not particularly limited as long as it is capable of dissolving liquid crystal, and any one of various organic solvents such as toluene can be used; provided, however, that the solvent preferably allows the birefringence layer composition liquid having a uniform thickness to be applied to the vertical alignment layer 10.

The loading of the liquid crystal monomers 3 in the birefringence layer composition liquid is preferably in the range of 10 to 50 wt % although the preferable range varies depending on, for example, an application method, a thickness, and the kind of the solvent. In the birefringence layer composition liquid, a compounding ratio (weight ratio) of the additive 5 to the liquid crystal monomers 3 is 1/7 to 1/3.

The additive 5 in the present invention is not particularly limited as long as it is a compound capable of promoting the homeotropic orientation of a liquid crystal monomer which is of the above-described rod-like molecular shape and which is polymerizable. Examples of the additive 5 can include the above-described polyimide, a surfactant, a coupling agent, and combination of them. Although the loading of the additive 5 to be used varies depending on, for example, a material for the base material, the thickness of the birefringence layer, and the orientation restraining force of the additive to be used, a preferable loading range is, for example, as described below.

When soluble polyimide or polyamic acid is loaded as the additive 5 into the birefringence layer composition liquid, the loading of the additive is in the range of preferably 12.5 to 25 wt %, or more preferably 15 to 22.5 wt % with respect to the total amount of polymerizable liquid crystal. A loading of polyamic acid serving as the additive 5 of less than 12.5 wt % may make it difficult to obtain a birefringence layer composition that is sufficiently uniformly oriented. A loading in excess of 25 wt % may reduce light transmittance.

When a coupling agent or a surfactant is loaded as the additive 5, the loading of the additive is in the range of preferably 0.001 to 5 wt %, more preferably 0.01 to 1.0 wt %, or still more preferably 0.05 to 0.5 wt % with respect to the total amount of the polymerizable liquid crystal.

A combination of multiple compounds each of which is capable of promoting the homeotropic orientation of the above liquid crystal monomers can be used as the additive 5. The loading of the combination can be appropriately determined because the loading varies depending on, for example, a material for the base material, the thickness of the birefringence layer, and the orientation restraining force of the additive to be used. For example, when a combination of a surfactant and a silane coupling agent is used as the additive 5, a mass ratio of the surfactant to the solid content of the silane coupling agent is preferably appropriately selected from the range of about 1/100 to 1/1 although the mass ratio varies depending on, for example, the orientation restraining force of the silane coupling agent to be used. The diluent of a commercially available vertical alignment layer solution may also be used as the additive 5. In this case, the composition ratio of the vertical alignment layer solution can be directly adopted as the loading of the additive 5.

The refractive index layer composition liquid may be added with a photopolymerization initiator or a sensitizer as required.

Examples of the photopolymerization initiator include: benzyl (or bibenzoyl); benzoin isobutyl ether; benzoin isopropyl ether; benzophenone; benzoylbenzoic acid; methyl benzoyl benzoate; 4-benzoyl-4'methyldiphenylsulfide; benzyl methyl ketal; dimethylaminomethyl benzoate; 2-n-butoxyethyl-4-dimethylamino benzoate; isoamyl p-dimethylamino benzoate; 3,3'-dimethyl-4-methoxybenzophenone; methylbenzoyl formate; 2-methyl-1-(4-(methylthio)phenyl)-2-morpholinopropane-1-one; 2-benzyl-2-dimethylamino-1-(4-morpholinophenyl)-butane-1-one; 1-(4-dodecylphenyl)-2-hydroxy-2-methylpropane-1-one; 1-hydroxycyclohexylphenylketone; 2-hydroxy-2-methyl-1-phenylpropane-1-one; 1-(4-isopropylphenyl)-2-hydroxy-2-methylpropane-1-one; 2-chlorothioxanthone; 2,4-diethylthioxanthone; 2,4-diisopropylthioxanthone; 2,4-dimethylthioxanthone; isopropylthioxanthone; and 1-chloro-4-propoxythioxanthone.

When a photopolymerization initiator is loaded into the birefringence layer composition liquid, the loading of the photopolymerization initiator is in the range of 0.01 to 10 wt %. The loading of the photopolymerization initiator is preferably such that damage to the orientation of a liquid crystal molecule is reduced to the extent possible. In view of this point, the loading is in the range of preferably 0.1 to 7 wt %, or more preferably 0.5 to 5 wt %.

When a sensitizer is loaded into the birefringence layer composition liquid, the loading of the sensitizer can be appropriately selected from the range in which the orientation of a liquid crystal molecule is not largely damaged. To be specific, the loading is selected from the range of 0.01 to 1 wt %.

In addition, only one kind of photopolymerization initiator (or sensitizer) may be used, or two or more kinds of photopolymerization initiators (or sensitizers) may be used in combination.

Hereinafter, a method of producing the optical element of the present invention will be described in more detail. In the following description, an optical element is used, which has a vertical alignment layer formed by means of a surfactant and a birefringence layer formed by means of a birefringence layer composition liquid containing, as an additive, a surfactant serving as the same component as that of the vertical alignment layer.

At first, a layer composition liquid containing a surfactant is prepared by means of such material as described above. The liquid is applied to the upper surface of the base material 2 having light transmittance by means of a method such as flexographic printing or spin coating to produce a coating film for a vertical alignment layer. Furthermore, the coating film for a vertical alignment layer is cured to produce a vertical alignment layer-formed base material in which the vertical alignment layer is formed on the base material.

Next, liquid crystal monomers each serving as polymerizable liquid crystal and a surfactant are dissolved into a solvent to prepare a birefringence layer composition liquid. The liquid is applied to the vertical alignment layer-formed base material to produce a coating film for a birefringence layer.

At first, the birefringence layer composition liquid is applied to the vertical alignment layer-formed base material by means of any one of methods such as various printing methods (including die coating, bar coating, slide coating, and roll coating) and spin coating. The base material to which the birefringence layer composition liquid has been applied is dried to form a coating film for a birefringence layer. At this time, the base material to which the birefringence layer composition liquid has been applied can be air-dried under atmospheric pressure.

When the surface of the vertical alignment layer-formed base material has high water repellency or high oil repellency, the wettability of the surface of the vertical alignment layer-formed base material to which the birefringence layer composition liquid is to be applied may be improved in advance through UV washing or a plasma treatment to the extent that liquid crystal can be homeotropically oriented.

Next, the liquid crystal monomers in the coating film for a birefringence layer are homeotropically oriented.

To be specific, the coating film for a birefringence layer is heated so that the temperature of the coating film for a birefringence layer becomes equal to or higher than the temperature (liquid crystal phase temperature) at which the liquid crystal in the coating film becomes a liquid crystal phase and lower than the temperature at which the liquid crystal in the coating film becomes an isotropic phase (liquid phase). Thus, the liquid crystal is homeotropically oriented. At this time, a method of heating the coating film for a birefringence layer is not particularly limited. A method involving placing the coating film in a heating atmosphere is permitted. A method involving heating the coating film with infrared light is also permitted.

A method of homeotropically orienting the liquid crystal is not limited to the above method. For example, depending on a liquid crystal monomer in the coating film for a birefringence layer and the state of the coating film, a method involving drying the coating film for a birefringence layer under reduced pressure or a method involving applying an electric field or a magnetic field to the coating film for a birefringence layer from a predetermined direction can be employed for realizing the homeotropic orientation.

When the coating film for a birefringence layer is dried under reduced pressure so that a liquid crystal monomer is homeotropically oriented, establishing a decompressed state can bring the coating film for a birefringence layer into a supercooled state. As a result, the coating film for a birefringence layer can be additionally cooled to room temperature while the homeotropically oriented state of a liquid crystal monomer in the coating film is maintained. In this case, a state where the liquid crystal is homeotropically oriented is maintained efficiently until the liquid crystal monomers are subjected to a crosslinking reaction.

Next, the homeotropically oriented liquid crystal is subjected to a crosslinking reaction in the coating film for a birefringence layer so that the orientation is fixed.

The crosslinking reaction progresses through the irradiation of the coating film for a birefringence layer with light having a wavelength to which a liquid crystal monomer is sensitive. At this time, the wavelength of light with which the coating film for a birefringence layer is irradiated is appropriately selected in accordance with the kind of a liquid crystal monomer in the coating film. Light with which the coating film for a birefringence layer is irradiated is not limited to monochromatic light, or may be light having a certain wavelength range including the wavelength to which the liquid crystal is sensitive. To be specific, active radiation such as ultraviolet light is generally applied.

The crosslinking reaction of the liquid crystal is preferably performed while the coating film for a birefringence layer is heated to a temperature lower than the temperature at which the liquid crystal undergoes a phase transition from a liquid crystal phase to an isotropic phase by 1 to 10° C. This action can reduce the disturbance of the homeotropic orientation of the liquid crystal at the time of the crosslinking reaction. In addition, in view of the foregoing, the temperature at which the crosslinking reaction is performed is more preferably a temperature lower than the temperature at which the liquid crystal undergoes a phase transition from a liquid crystal phase to an isotropic phase by 3 to 6° C.

The crosslinking reaction of liquid crystal may be performed by means of a method involving irradiating a coating film for a birefringence layer with light having a wavelength to which the liquid crystal is sensitive while heating the coating film up to a liquid crystal phase temperature in an inert gas atmosphere. The above method is preferable because the liquid crystal is crosslinked in the inert gas atmosphere, and the disturbance of the homeotropic orientation of a liquid crystal molecule at a position distant from a vertical alignment layer can be suppressed as compared to the case where the liquid crystal is crosslinked in an air atmosphere.

Alternatively, the crosslinking reaction of the liquid crystal may be performed by means of a method involving the steps of: irradiating the coating film for a birefringence layer with light having a wavelength to which the liquid crystal is sensitive while heating the coating film up to the liquid crystal phase temperature in an inert gas atmosphere or in the air atmosphere, to thereby partially progress the crosslinking reaction (referred to as a partial crosslinking step); cooling the coating film for a birefringence layer to the temperature (Tc) at which the liquid crystal becomes a crystal phase after the partial crosslinking step; and additionally irradiating the coating film for a birefringence layer with light having a wavelength to which the liquid crystal is sensitive in this state, to thereby progress and complete the crosslinking reaction. The above-mentioned temperature Tc is the temperature at which the liquid crystal becomes a crystal phase in the coating film for a birefringence layer before the progress of the crosslinking reaction.

In the partial crosslinking step, the crosslinking reaction proceeds to the extent that the homeotropic orientation of the liquid crystal in the coating film for a birefringence layer is maintained even when the coating film is cooled to the temperature Tc. Therefore, the degree to which the crosslinking reaction proceeds in the partial crosslinking step is appropriately selected depending on, for example, the kind of the liquid crystal in the coating film for a birefringence layer and the thickness of the coating film. In the partial crosslinking step, the crosslinking reaction is preferably caused to proceed in such a manner that the degree of crosslinking of the liquid crystal becomes about 5 to 50.

Upon completion of the crosslinking step, a base material, a vertical alignment layer, a liquid crystal layer including a birefringence layer composed of liquid crystal monomers which are homeotropically oriented and the orientation of each of which is fixed as a result of crosslinking of the monomers is formed.

After the crosslinking step, the optical element is baked. The baking step is an important step because the heat resistance and adhesiveness of the birefringence layer can be improved with the step. However, on the other hand, the baking causes a surfactant used as an additive to bleed and agglomerate so that an additive layer is formed on the surface of the birefringence layer.

The baking step can be performed by: installing the optical element obtained by completing the crosslinking step in, for example, an oven heated to a certain temperature; and heating the optical element. For example, the baking step can be performed in the air atmosphere and under atmospheric pressure by means of a "circulating hot air oven KLO-60M"

manufactured by AS ONE CORPORATION. A baking temperature and a baking time can be appropriately determined depending on, for example, the thickness of the optical element, in particular, the thickness of the birefringence layer, and the kind of a liquid crystal monomer to be used. The baking time is preferably in the range of 0.5 hour to 2.5 hours (both inclusive), and the baking temperature is preferably in the range of 200° C. to 250° C. (both inclusive). A baking time in the baking step in excess of 2.5 hours may cause the yellowing or the like of the optical element so that the permeability of the optical reduces. In addition, a baking time of less than 0.5 hour may reduce adhesiveness, heat resistance, and a degree of cure so that sufficient durability cannot be obtained.

After the baking, the additive layer constituted by the surfactant is removed. A method of removing the additive layer is not particularly limited as long as the additive layer can be removed with the method. Examples of such method include: a method involving grinding the layer by means of a grinding attachment; a method involving removing the layer through a solvent treatment by means of a spin coater; and a method involving removing the layer by means of a plasma etching device. In removal of the additive layer, a part of the birefringence layer which is positioned below the additive layer is also removed, to cause reduction in the phase difference control function of the birefringence layer. Therefore, the method which is able to adjust the amount of the layer to be removed is preferable. The thickness of the additive layer is determined by, for example, the dose of light in the crosslinking step, the kind of the additive, and the amount of the additive to be added. Therefore, the thickness to be removed may be determined by acknowledging in advance the thickness of the additive layer to be formed upon design and production of the optical element.

As described above, the optical element of the present invention has a birefringence layer obtained by fixing liquid crystal monomers that are in homeotropically oriented states, and an additive layer formed on the upper surface of the side of the birefringence layer is removed. Accordingly, an excellent phase difference control function can be exerted, and a haze can be reduced to 0.1 or less with reliability. Therefore, the optical element has an improved degree of transparency in its thickness direction. In addition, the occurrence of a portion with a discontinuous refractive index in the thickness direction of the optical element is suppressed, so the scattering of light passing through the optical element in the thickness direction can be suppressed.

In the optical element 1 in the present invention, the birefringence layer 4 has a structure obtained by crosslinking and polymerizing the liquid crystal monomers 3 while maintaining the homeotropically oriented states of the monomers. Suppose xyz orthogonal coordinates with the thickness direction of the birefringence layer 4 as a z axis. In this case, a refractive index nx in an x axis direction and a refractive index ny in a y axis direction have substantially the same value, and a refractive index nz in the z axis direction can be made larger than the refractive indices nx and ny. Therefore, in the optical element 1, the birefringence layer 4 can be a layer having birefringence property with which the refractive indices satisfy the relationship of nz>nx=ny, that is, a layer having an optical axis in its thickness direction (z axis direction) and uniaxial birefringence property. The layer 4 can be caused to function as a so-called "+C plate" and as a member having a phase difference control function with which the retardation of light can be optically compensated.

The optical element of the present invention has liquid crystal fixed in a homeotropically oriented state. Therefore, the optical element can be used as, for example, an element for controlling the polarized state of light such as an element for controlling a phase difference or an optical compensation element. In consideration of the fact that the scattering of light can be suppressed as described above, the optical element can be an element having a function of controlling a phase difference with improved finesse. As a result, a liquid crystal display device capable of reducing light leak with improved finesse can be produced by means of the optical element. Furthermore, a liquid crystal display device with an expanded viewing angle, improved contrast, and suppressed color unevenness in its liquid crystal display screen can be produced.

The birefringence property of the optical element 1 is hardly influenced by heat because the birefringence layer 4 has a crosslinked structure.

The production cost of the optical element 1 can be easily suppressed because the birefringence layer 4 can be formed through a relatively easy process involving: applying a layer composition liquid to the base material 2 to produce the vertical alignment layer 10; applying a birefringence layer composition liquid to the layer 10; orienting liquid crystal; and crosslinking the liquid crystal.

Furthermore, the optical element 1 has the birefringence layer 4 formed by means of a birefringence layer composition liquid containing the additive 5 for promoting the homeotropic orientation of each of the liquid crystal monomers 3. As a result, the birefringence layer 4 of the optical element 1 can bring the degree of homeotropic orientation of each of the liquid crystal monomers 3 at positions apart from the base material 2 or the vertical alignment layer 10 close to the degree of homeotropic orientation of each of the liquid crystal monomers 3 adjacent the base material 2 or the vertical alignment layer 10. As a result, a state where the liquid crystal is homeotropically oriented with improved uniformity can be formed in the thickness direction of the birefringence layer 4.

The optical element 1 can be laminated and formed integrally on a member constituting a liquid crystal panel. As a result, an optical instrument can be designed without the separate arrangement of any phase difference control member.

The optical element of the present invention may include a functional layer having a function of changing the state of light and different from the birefringence layer which is laminated on at least one of the external surface and substrate surface of the optical element of a first embodiment of the present invention (hereinafter referred to as a "second embodiment").

The optical element of the second embodiment will be described by taking the case where a layer different from the birefringence layer in birefringence property is formed as a functional layer on the external surface of the optical element of the first embodiment as an example. As shown in, for example, FIG. 5, the optical element of the second embodiment can be formed in such a manner that a functional layer 2c is positioned between the base material 2 and the vertical alignment layer 10.

The functional layer 2c in the optical element of the second embodiment may be a layer (hereinafter referred to as the "different birefringence layer") having birefringence property different from that of the birefringence layer in the first embodiment (+C plate).

To be specific, the different birefringence layer may be a layer having birefringence property with which the above-described refractive indices satisfy the relationship of nz=nx<ny or nz=ny<nx, that is, a layer functioning as a so-called "+A plate". Alternatively, the layer may be a layer having birefringence property with which the above-described refractive indices satisfy the relationship of nz<nx=ny, that is, a layer functioning as a so-called "−C plate".

The above-described layer functioning as the so-called "+A plate" can be obtained by: forming a coating film for forming a horizontal alignment layer of, for example, a resin material capable of horizontally orienting liquid crystal on the surface of a base material or on a birefringence layer; subjecting the surface of the coating film for forming a horizontal alignment layer to a rubbing treatment or a light orientation treatment to produce a horizontal alignment layer; applying a solution prepared by dissolving liquid crystal into a solvent to the horizontal alignment layer; and fixing the solution in a homogeneously oriented state.

The above-described layer functioning as the so-called "−C plate" can be obtained by: applying a solution prepared by dissolving liquid crystal and a chiral agent into a solvent to the surface of a base material or to a birefringence layer; and fixing the solution.

The chiral agent is added for orienting a liquid crystal molecule in a helical fashion. When the liquid crystal molecule takes a helical pitch in an ultraviolet region, a specific reflected color occurs owing to a selective opposition phenomenon. Therefore, the loading of the chiral agent is preferably such amount that a helical pitch in which the selective opposition phenomenon occurs in the ultraviolet region is obtained.

The optical element of the second embodiment is obtained by laminating layers different from each other in birefringence property. When a liquid crystal display device provided depending on the optical element is produced, upon acknowledgement of light that has passed through the liquid crystal display device, a change in magnitude of retardation depending on the position at which an observer views the passed light can be efficiently suppressed.

The optical element of the present invention includes a coloring layer which may be formed in the optical element of the first or second embodiment of the present invention (hereinafter referred to as a "third embodiment").

The optical element of the third embodiment will be described by taking the case where a coloring layer is formed as a functional layer on the substrate of a base material as an example (FIG. 6A).

FIG. 6A is a schematic view showing the sectional structure of an example of the optical element of the third embodiment.

An optical element 1b has a substrate 2a as a base material, and a coloring layer 11 is formed on one surface of the substrate. The coloring layer 11 is composed of a coloring pixel portion 12 through which visible light in a predetermined wavelength region passes and a light-shielding portion 13 (which may be referred to as a black matrix or a BM).

The coloring pixel portion 12 is formed by arranging coloring pixels through which light beams having the wavelength ranges of the respective colors (red, green, and blue) pass (referred to as a red coloring pixel 12R, a green coloring pixel 12G, and a blue coloring pixel 12B) in a predetermined pattern. The arrangement mode of the red coloring pixel 12R, the green coloring pixel 12G, and the blue coloring pixel 12B each constituting the coloring pixel portion 12 can be selected from various arrangement patterns such as a stripe type pattern, a mosaic type pattern, and a triangle type pattern.

Coloring pixels through which light beams having the wavelength ranges of the complementary colors for the respective colors pass can be used instead of those coloring pixels (12R, 12G, and 12B).

The coloring pixel portion 12 is formed by patterning the coating film of a coloring material dispersion liquid prepared by dispersing a coloring material for each of the coloring pixels (12R, 12G, and 12B) of the respective colors into a solvent into a predetermined shape by means of, for example, a photolithography method.

The coloring pixel portion 12 can also be formed by applying a coloring material dispersion liquid for each of the coloring pixels (12R, 12G, and 12B) of the respective colors in a predetermined shape as well as a photolithography method.

The light-shielding portion 13 prevents the coloring pixels (12R, 12G, and 12B) from being superimposed on one another, and fills a gap between adjacent coloring pixels to suppress the leak of light (leaked light) from a position between the adjacent coloring pixels. In addition, the light-shielding portion suppresses the light degradation or the like of an active device when the optical element is used for a member for a liquid crystal display device of an active matrix drive system.

Therefore, the light-shielding portion 13 is formed in such a manner that regions corresponding to the positions at which the coloring pixels are arranged on the surface of the substrate 2a are compartmentalized for the respective coloring pixels (12R, 12G, and 12B) in a plan view. In addition, the coloring pixels (12R, 12G, and 12B) of the respective colors are arranged in accordance with the positions at which the coloring pixels are formed in the regions on the surface of the substrate 2a compartmentalized by the light-shielding portion 13 in such a manner that the regions are covered with the coloring pixels in a plan view.

The light-shielding portion 13 can be formed by patterning a metal thin film having light-shielding property or light-absorbing property such as a metal chromium thin film or a tungsten thin film in a predetermined shape onto a substrate surface. In addition, the light-shielding portion can be formed by printing an organic material such as a black resin in a predetermined shape.

The coloring layer 11 is not limited to such layer including coloring pixels for multiple colors as described above, and may be constituted by means of a coloring pixel for a single color. In this case, the coloring layer 11 may be free of the light-shielding portion 13.

The optical element of the third embodiment has been described by taking the case where all of the coloring pixel portion 12 and the light-shielding portion 13 constituting the coloring layer 11 are arranged on a substrate as an example. However, the present invention is not limited thereto. As shown in FIG. 6B, the optical element may be formed by: forming only the light-shielding portion 13 in the coloring layer on a substrate to provide a base material; laminating the vertical alignment layer 10 and the birefringence layer 4 on the base material; and arranging the coloring pixel portion 12 on the resultant. In such case, the additive layer on the surface of the birefringence layer 4 must be removed before the arrangement of the coloring pixel portion 12.

According to the optical element of the third embodiment shown in FIG. 6A, the coloring layer 11 on the substrate 2a can be covered with the birefringence layer 4. In this case, the heat resistance of the coloring pixel portion 12 to be covered with the vertical alignment layer 10 or with the birefringence layer 4 can be improved because the heat resistance of the birefringence layer 4 is relatively high.

When the optical element is provided with a coloring layer, as shown in FIG. 6C, the coloring layer 11 may be laminated on the birefringence layer 4 in addition to the above case. In such case, the additive layer on the surface of the birefringence layer 4 must be removed before the coloring layer 11 is formed.

Next, a member for a liquid crystal display device using the optical element of the first or second embodiment (which may be referred to as a member for a liquid crystal display device of a first embodiment) will be described in detail.

FIGS. 7A and 7B are schematic views each showing an example of the member for a liquid crystal display device of the present invention.

Description will be given of the case where the optical element of the first embodiment is formed on one side of a laminated structure as an example of a member for a liquid crystal display device.

As shown in FIG. 7A, a member 50a for a liquid crystal display device includes two laminated structures 14 (14a and 14b) each having light transmittance, and a liquid crystal layer 17 is formed between the laminated structures 14a and 14b.

The laminated structure 14a in which no optical element is formed includes a substrate 16 and an alignment layer 15 formed on the substrate 16. The laminated structure 14b in which the optical element 1a is formed includes the respective layers (2, 10, and 4) of which the optical element 1a is formed and the alignment layer 15. In addition, the laminated structures 14 are arranged in such a manner that the alignment layers 15 and 15 of both the laminated structures 14a and 14b are opposite to each other.

The liquid crystal layer 17 is formed by sealing liquid crystal into a gap between the laminated structures 14a and 14b. The liquid crystal to be sealed is appropriately selected.

The liquid crystal layer 17 is formed as described below. That is, a clearance gap (cell gap) between the laminated structures 14a and 14b arranged so as to be opposite to each other with a slight gap between them is fixed by means of a spacer 18 (such as a spherical spacer or a columnar spacer). Then, a space portion compartmentalized between the laminated structures 14a and 14b is formed by means of a sealant (a thermosetting resin). Filling the space portion with a liquid crystal material results in the sealing of liquid crystal, thereby the liquid crystal layer 17 is formed.

Each of the alignment layers 15 is a horizontal alignment layer for horizontally orienting the liquid crystal in the liquid crystal layer 17 formed between the laminated structures 14 or a vertical alignment layer for vertically orienting the liquid crystal. Which one of a horizontal alignment layer and a vertical alignment layer is used as the alignment layer can be appropriately selected.

The member 50a for a liquid crystal display device of the first embodiment is provided with the optical element 1a including the birefringence layer 4. Therefore, a liquid crystal display device having relatively high heat resistance can be obtained at a low cost. In addition, there is no need to interpose a phase difference control film separately for optical compensation, so the thickness of the member for a liquid crystal display device can be reduced. Moreover, the need for an adhesive material that must be applied upon interposition of the phase difference control film is eliminated, so display property can be additionally improved. As a result, a transmission liquid crystal display device that can find use in a variety of applications can easily be provided at a low cost.

The member for a liquid crystal display device may be constituted by forming an optical element in each of the laminated structures opposite to each other in addition to the above-described example.

The member for a liquid crystal display device may be such that the optical element 1a is formed in such a manner that the birefringence layer 4 is positioned between the base material 2 and the liquid crystal layer 17 like the member 50a for a liquid crystal display device shown in FIG. 7B. In this case, the birefringence layer 4 can be prevented from being exposed to the external surface of the member for a liquid crystal display device. As a result, the possibility that the birefringence layer 4 is damaged by an acting force from the outside in the course of the use of the member can be suppressed.

Next, a member for a liquid crystal display device using the optical element of the third embodiment (hereinafter referred to as the member for a liquid crystal display device of a second embodiment) will be described.

FIG. 8 is a schematic view showing an example of a member 50b for a liquid crystal display device of the second embodiment of the present invention. In the member for a liquid crystal display device, the case where the optical element of the third embodiment is formed on one side of a laminated structure is taken as an example.

The member 50b for a liquid crystal display device of the second embodiment includes two laminated structures 14a and 14c each having light transmittance as in the case of the member for a liquid crystal display device of the first embodiment. The liquid crystal layer 17 is formed between the laminated structures 14a and 14c. The laminated structure 14a in which the optical element 1b is not formed is obtained by forming the alignment layer 15 on the substrate 16.

In the member 50b for a liquid crystal display device, the laminated structure 14c in which the optical element 1b is formed has the alignment layer 15 arranged in such a manner that the birefringence layer 4 is positioned between the alignment layer and the substrate 2a. The laminated structures 14a and 14c are arranged in such a manner that the alignment layers 15 and 15 are opposite to each other.

The optical element 1b of the third embodiment is formed in the laminated structure 14c, and a protective layer 21 that serves to flatten the surface on which the alignment layer 15 is laminated and formed is arranged between the optical element 1b and the alignment layer 15. Additionally the protective layer 21 is arranged to protect the birefringence layer 4 while additionally improving the chemical resistance, heat resistance, resistance to indium tin oxide (ITO), and the like of the birefringence layer 4.

The protective layer 21 can be formed of: any one of various photo-setting or thermosetting resins such as an acrylic resin, an epoxy-based resin, and polyimide; or a two-liquid setting resin. The protective layer can be formed by means of a method such as spin coating, printing, or photolithography depending on a material for the layer. The thickness of the protective layer 21 is in the range of 0.3 to 5.0 μm, or preferably 0.5 to 3.0 μm.

A member for a liquid crystal display device having such structure can be used for, for example, a liquid crystal panel for color display in a reflection liquid crystal display device.

Next, a liquid crystal display device 100a using the member for a liquid crystal display device of the first embodiment (liquid crystal display device of a first embodiment) will be described. In Examples, in particular, the case where the liquid crystal display device is of an in-plain switching mode (IPS mode) system will be described as an example.

As shown in FIG. 9A, polarizing plates 31 and 31 are arranged on both external surfaces of the member 50a for a liquid crystal display device. In addition, a flat electrode portion 25 interposed and formed between the substrate 16 and the alignment layer 15 each constituting the laminated structure 14a of the member 50a for a liquid crystal display device, and a light irradiation portion 30 are arranged.

The polarizing plates 31 and 31 are stuck to both external surfaces of the member 50a for a liquid crystal display device. Alternatively, both the polarizing plates 31 and 31 may be arranged in such a manner that they establish a crossed nicol relationship, or may be arranged in such a manner that they establish a parallel nicol relationship.

The flat electrode portion 25 is composed of a liquid crystal driving electrode portion 26 and a common electrode portion 27 which electrically corresponds to the liquid crystal driving electrode portion 26 and which faces the portion 26. Both the liquid crystal driving electrode portion 26 and the common electrode portion 27 are arranged between the same substrate 16 and the liquid crystal layer 17. The flat electrode portion 25 changes the orientation of a liquid crystal molecule in the liquid crystal layer 17 through the application of a voltage.

The liquid crystal driving electrode portion 26 includes: many liquid crystal driving electrodes 26a arranged in a matrix manner; and a flattening film 26b for flattening a surface.

Each of the many liquid crystal driving electrodes 26a arranged in a matrix manner constitutes a single pixel for each region in which the liquid crystal driving electrode is arranged. The liquid crystal driving electrodes 26a travel longitudinally across substantially the central portions of the corresponding pixels in a plan view. Each of the liquid crystal driving electrodes 26a is formed of a transparent electrode material such as indium tin oxide (ITO).

The common electrode portion 27 includes common electrodes 27a each of which is capable of generating an electric field in a gap between the common electrode 27a and the corresponding liquid crystal driving electrode 26a. In addition, a protective layer 27b with which the common electrodes are covered so as to be out of physical contact with the liquid crystal driving electrode portion 26 is formed in the portion 27. The common electrodes 27a are arranged as described below. That is, two of the common electrodes 27a are arranged on both sides of each pixel train formed of the respective liquid crystal driving electrodes 26a arranged in a matrix manner so as to correspond to the train.

Each of the common electrodes 27a can be formed of a metal such as tantalum (Ta) or titanium (Ti).

In the liquid crystal display device 100a, a voltage is applied to the liquid crystal layer for each pixel, and the amount of light passing through a polarizing plate out of light received from the light irradiation portion 30 is controlled for each pixel. Then, in the liquid crystal display device, light emitted to the outside through the polarizing plate for each pixel entirely forms an image.

The liquid crystal display device 100a of the first embodiment can be used also as an on-vehicle liquid crystal display device having relatively high heat resistance and exposed to a relatively-high-temperature environment because the member 50a for a liquid crystal display device has the birefringence layer 4 having a crosslinked structure with improved uniformity of homeotropic orientation. In addition, a liquid crystal display device can be provided at a low cost because the production cost of the flat electrode portion 25 can be easily suppressed. In addition, in a conventional liquid crystal display device, a film (phase difference control film) for correcting a phase difference has been stuck as a separate body by means of an adhesive or the like for correcting a narrow viewing angle. In contrast, the liquid crystal display device 100a eliminates the need for such film, so a thickness for arranging an adhesive is not needed. As a result, the thickness of the device can be reduced. In addition, the possibility of the irregular reflection, absorption, or the like of light due to the adhesive can be reduced.

Furthermore, a liquid crystal display device 100b using the member for a liquid crystal display device of the second embodiment (liquid crystal display device of a second embodiment) will be described. In Examples, in particular, the case where the liquid crystal display device is of an active matrix system will be described as an example (FIG. 9B).

In the liquid crystal display device 100b, the polarizing plates 31 and 31 are arranged on both side surfaces of the member 50b for a liquid crystal display device. In addition, an electrode portion 29 is interposed between the substrates 16 and 2a constituting the laminated structures of the member 50b for a liquid crystal display device, and the light irradiation portion 30 is provided for the device 10b.

The electrode portion 29 is composed of pixel electrode portions 26 arranged for the respective pixels and a common electrode portion 28 which electrically corresponds to each of the pixel electrode portions 26 and which faces the portion 26. The pixel electrode portions 26 and the common electrode portion 28 are arranged in such a manner that the liquid crystal layer 17 is interposed between them.

The pixel electrode portions 26 are formed as described below. The pixel electrodes 26a are arranged in a matrix manner so that each of them is in one-to-one correspondence with any one of the coloring pixels 12R, 12G, and 12B in its thickness direction. Each pixel electrode portion is provided with: a switching circuit portion (not shown) provided for each pixel electrode; a signal line 26c and a scanning line (not shown) electrically connected to the switching circuit portion; an interlayer insulator (not shown) for electrically separating the signal line 26c and the scanning line; a protective film 26d for electrically separating the signal line 26c and the pixel electrode; and the flattening film 26b with which the protective film 26d and the pixel electrode 26a are covered for flattening a surface.

In the electrode portion 29, the scanning line and the signal line 26c are arranged so as to intersect each other in a lattice fashion between adjacent pixel electrodes. The scanning line/the signal line 26c is covered along its longitudinal direction with the interlayer insulator/the protective film 26d.

Each of the scanning line and the signal line is formed of a metal such as tantalum (Ta) or titanium (Ti). The interlayer insulator is formed of, for example, an electrically insulating substance such as a silicon oxide. In addition, the protective film is formed of a silicon nitride or the like.

Each of the many pixel electrodes arranged in a matrix manner constitutes a single pixel for each region in which the pixel electrode is arranged.

Each of the pixel electrodes is formed of a transparent electrode material such as indium tin oxide (ITO).

The switching circuit portion is arranged in correspondence with a pixel electrode, and electrically connects the pixel electrode with the scanning line and the signal line. The switching circuit portion is supplied with an electrical signal from the scanning line to control the state of energization between the signal line and the pixel electrode. Specific examples of the switching circuit portion include active devices such as a three-terminal type device (for example, a thin-film transistor) and a two-terminal type device (for example, a metal insulator metal (MIM) diode).

The common electrode portion 28 is formed of a transparent electrode material such as indium tin oxide (ITO) into a film shape.

The liquid crystal display device 100b of the second embodiment eliminates the need to arrange a phase difference control film as a separate body as in the case of the liquid crystal display device 100a of the first embodiment. As a result, the thickness of the device can be reduced. In addition, an adhesive to be used upon sticking of a film is not needed, so the possibility of the irregular reflection or absorption of light due to an adhesive material can be reduced.

EXAMPLES

Next, the present invention will be described in more detail by way of examples and comparative examples.
(Pretreatment for Glass Base Material)
A no-alkali glass plate having a low expansion coefficient (1737 glass manufactured by Corning Incorporated and measuring 100 mm long by 100 mm wide by 0.7 mm thick) was prepared as a base material subjected to an appropriate washing treatment to be clean.
(Preparation of Vertical Alignment Layer Solution)
A JALS-2021-R2 (manufactured by JSR) was used as a vertical alignment layer solution containing polyamic acid or the like as a component for promoting the homeotropic orientation of a polymerizable liquid crystal monomer, and was diluted with γ-butyrolactone to 50%.
(Preparation of Birefringence Layer Composition Liquid)
A birefringence layer composition liquid to be used for the formation of a birefringence layer was prepared as described below. 20 parts by weight of the compound shown in [Chem 11] (provided that X represents 6) as a polymerizable liquid crystal monomer molecule showing a nematic liquid crystal phase, 0.8 part by weight of a photopolymerization initiator ("IRGACURE 907" manufactured by Ciba-Geigy), 59.2 parts by weight of chlorobenzene as a solvent, and 20 parts by weight of a solution prepared by diluting the above solution for forming a vertical alignment layer JALS-2021-R2 with diethylene glycol dimethyl ether to 12.5% were mixed to prepare a birefringence layer composition liquid.
(Preparation of Coloring Resist)
A pigment-dispersed photoresist was used as a coloring material for each of: a black matrix; and red (R), green (G), and blue (B) coloring pixels. The pigment-dispersed photoresist is obtained by: adding beads to a dispersion liquid composition (containing a pigment as a coloring material, a dispersant, and a solvent); dispersing the resultant by means of a dispersing device for 3 hours; and mixing the dispersion liquid from which the beads have been removed and a clear resist composition (containing a polymer, a monomer, an additive, an initiator, and a solvent). The composition is shown below. A PAINT SHAKER (manufactured by ASADA TEKKO) was used as the dispersing device.
The composition of each photoresist is shown below.

| (Photoresist for black matrix) | |
|---|---|
| Black pigment (TM BLACK #9550 manufactured by Dainichiseika Color & Chemicals Mfg. Co., Ltd.) | 14.0 parts by weight |
| Dispersant (Disperbyk 111 manufactured by BYK-Chemie) | 1.2 parts by weight |
| Polymer (VR60 manufactured by SHOWA HIGHPOLYMER CO., LTD.) | 2.8 parts by weight |
| Monomer (SR399 manufactured by Sartomer Company, Inc.) | 3.5 parts by weight |
| Additive (L-20 manufactured by Soken Chemical & Engineering Co. Ltd.) | 0.7 part by weight |

| (Photoresist for black matrix) | |
|---|---|
| Initiator (2-benzyl-2-dimethylamino-1-(4-morpholinophenyl)-butanone-1) | 1.6 parts by weight |
| Initiator (4,4'-diethylaminobenzophenone) | 0.3 part by weight |
| Initiator (2,4-diethylthioxanthone) | 0.1 part by weight |
| Solvent (ethyleneglycol monobutylether) | 75.8 parts by weight |

| (Photoresist for red (R) coloring pixel) | |
|---|---|
| Red pigment (C.I. PR254 (CROMOPHTAL DPP Red BP manufactured by Ciba Specialty Chemicals)) | 4.8 parts by weight |
| Yellow pigment (C.I. PY139 (Paliotol Yellow D1819 manufactured by BASF)) | 1.2 parts by weight |
| Dispersant (Solsperse 24000 manufactured by Zeneka Colours) | 3.0 parts by weight |
| Monomer (SR399 manufactured by Sartomer Company, Inc.) | 4.0 parts by weight |
| Polymer 1 | 5.0 parts by weight |
| Initiator (IRGACURE 907 manufactured by Nihon Ciba-Geigy K.K.) | 1.4 parts by weight |
| Initiator (2,2'-bis(o-chlorophenyl)-4,5,4',5'-tetraphenyl-1,2'-biimidazol) | 0.6 part by weight |
| Solvent (propyleneglycol monomethylether acetate) | 80.0 parts by weight |

| (Photoresist for green (G) coloring pixel) | |
|---|---|
| Green pigment (C.I. PG7 (Seika Fast Green 5316P manufactured by Dainichiseika Color & Chemicals Mfg. Co., Ltd.)) | 3.7 parts by weight |
| Yellow pigment (C.I. PY139 (Paliotol Yellow D1819 manufactured by BASF)) | 2.3 parts by weight |
| Dispersant (Solsperse 24000 manufactured by Zeneka Colours) | 3.0 parts by weight |
| Monomer (SR399 manufactured by Sartomer Company, Inc.) | 4.0 parts by weight |
| Polymer 1 | 5.0 parts by weight |
| Initiator (IRGACURE 907 manufactured by Nihon Ciba-Geigy K.K.) | 1.4 parts by weight |
| Initiator (2,2'-bis(o-chlcorophenyl)-4,5,4',5'-tetraphenyl-1,2'-biimidazol) | 0.6 part by weight |
| Solvent (propyleneglycol monomethylether acetate) | 80.0 parts by weight |

| (Photoresist for blue (B) coloring pixel) | |
| --- | --- |
| Blue pigment<br>(C.I. PB15:6 (Heliogen Blue L6700F manufactured by BASF)) | 4.6 parts by weight |
| Violet pigment<br>(C.I. PV23 (Hostaperm RL-NF manufactured by Clariant)) | 1.4 parts by weight |
| pigment derivative<br>(Solsperse 12000 manufactured by Zeneka Colours) | 0.6 part by weight |
| Dispersant<br>(Solsperse 24000 manufactured by Zeneka Colours) | 2.4 parts by weight |
| Monomer<br>(SR399 manufactured by Sartomer Company, Inc.) | 4.0 parts by weight |
| Polymer 1 | 5.0 parts by weight |
| Initiator<br>(IRGACURE 907 manufactured by Nihon Ciba-Geigy K.K.) | 1.4 parts by weight |
| Initiator<br>(2,2'-bis(o-chlorophenyl)-4,5,4',5'-tetraphenyl-1,2'-biimidazol) | 0.6 part by weight |
| Solvent<br>(propyleneglycol monomethylether acetate) | 80.0 parts by weight |

It should be noted that the polymer 1 described herein is obtained by adding 16.9 mol % of 2-methacryloyloxy ethylisocyanate with respect to 100 mol % of a copolymer consisting of benzylmethacrylate: styrene: acrylic acid: 2-hydroxyethyl methacrylate=15.6:37.0:30.5:16.9 (molar ratio), and has a weight average molecular weight of 42,500.

Example 1

The vertical alignment layer solution was patterned onto the upper surface of a glass base material by means of a flexographic printing method to form a film having a thickness of 600 Å. The resultant was baked at 180° C. for 1 hour, so a vertical alignment layer was formed on the glass base material. Next, the base material on which the vertical alignment layer had been formed was installed in a spin coater (trade name "1H-360S" manufactured by MIKASA), and the birefringence layer composition liquid prepared in advance was applied to the upper surface of the alignment layer by means of spin coating in such a manner that a thickness after drying would be about 1.5 μm. In this example, a spin coating method was adopted as a method of applying a liquid crystal solution. However, a method of applying a liquid crystal solution is not limited thereto. For example, die coating, slit coating, and an approach as a result of combination of them can be appropriately selected. The same holds true for the examples to be described later. Next, the base material to which the liquid crystal solution had been applied was heated on a hot plate at 100° C. for 3 minutes so that the remaining solvent was removed and a liquid crystal monomer in the liquid crystal solution was vertically oriented. The liquid crystal transition point at which the color of the film formed of the liquid crystal solution changed from white to transparent was visually observed, so the orientation of a liquid crystal molecule was confirmed.

Next, in the nitrogen atmosphere, the liquid crystal layer oriented on the glass base material was irradiated with ultraviolet light of 20 mW/cm² for 10 seconds by means of an ultraviolet irradiation device having an ultra-high pressure mercury lamp (trade name "TOSCURE 751" manufactured by HARISON TOSHIBA LIGHTING Corp.) so that the liquid crystal monomer molecules constituting the liquid crystal layer were three-dimensionally crosslinked. Thus, a base material 1 provided with a birefringence layer was formed.

After that, the base material 1 was subjected to a baking treatment at 230° C. for 1 hour in order to improve the heat resistance and adhesiveness of the birefringence layer in the base material 1.

Finally, the surface of the base material 1 (surface opposite to the glass base material) was etched through plasma dry etching, so a surface layer was removed from the surface by a depth of about 1,000 Å. Thus, Example 1 as the optical element of the present invention was produced. The plasma dry etching was performed by means of a DEA-506T device manufactured by ANELVA Corporation and an oxygen gas having a flow rate of 60 sccm and a gas pressure of 30 mTorr under the conditions including an RF power of 500 W and an etching time of 3 minutes.

Example 2

A base material 2 was formed in the same manner as in Example 1, and Example 2 was produced in the same manner as in Example 1 except that the surface of the base material 2 (surface opposite to the glass base material) was ground by means of a grinding attachment by a depth of 1,000 Å.

Comparative Example 1

A base material 3 provided with a vertical alignment layer and a birefringence layer on the upper surface of a glass base material was formed in the same manner as in Example 1, and was defined as Comparative Example 1.

(Evaluation 1)

The haze in each of Example 1, Example 2, and Comparative Example 1 thus obtained was measured. The haze was measured in conformance with JIS K 7136 by installing each optical element in a haze measuring machine. An "NDH-2000" manufactured by NIPPON DENSHOKU was used as the haze measuring machine.

As a result, the haze of each of the optical elements of Examples 1 and 2 was lower than 0.1, and showed a value as low as 0.06. In contrast, the haze of Comparative Example 1 was much larger than 0.1, and showed an extremely high value (1.0).

(Evaluation 2)

The structure of a liquid crystal layer to be formed on the surface opposite to a base material of Examples 1 and 2 was confirmed by means of the following evaluation method. A method involving measuring: the phase difference in the thickness direction (direction slanted from a film normal direction by 45°) of an optical element obtained by etching the surface opposite to the base material; and a haze distribution was adopted as the evaluation method. In addition, the mixed state of impurities in an etched region was analyzed. Furthermore, a polarized state was confirmed by rotation under polarizing plate crossed nicol. The above etching was performed by means of a DEA-506T device manufactured by ANELVA Corporation and oxygen as an etching gas under the conditions including an etching gas flow rate of 60 sccm, an etching gas pressure of 30 mTorr, and an electric power to be applied of 500 W. A TOF-SIMS manufactured by ULVAC-PHI, INC. was used for an impurity mixing analysis test.

As a result, neither phase difference nor haze changed up to a depth of about 1,200 Å from the surface of each of Examples 1 and 2 even after etching. In addition, the impurity mixed state of the region was investigated. As a result, no impurity was detected. This result confirmed that, on each of the surfaces in Examples 1 and 2, no additive layer to be acknowledged as an impurity was present and a birefringence layer was exposed to the surface of the optical element.

Meanwhile, Comparative Example 1 was evaluated in the same manner as that described above. As a result, up to a depth of about 1,000 Å from the surface, a haze was extremely high, and the mixing of impurities was confirmed. This confirmed that a layer different from a liquid crystal layer, that is, an additive layer was present.

The above results confirmed that the haze of the optical element of Comparative Example 1 in which the additive layer is present on the upper surface of the optical element shows a high value, but the haze of each of Examples 1 and 2 in each of which the additive layer is removed shows an extremely low value (0.1 or less).

Example 3

The liquid crystal display device shown in FIG. 9B was produced as a liquid crystal display device using the optical element of the present invention, and was defined as Example 3.

The optical element of the present invention was formed in the same manner as in Example 1 except that a coloring layer was formed between a glass base material washed through a pretreatment and a vertical alignment layer in order to produce Example 3.

To form the above coloring layer, at first, a photoresist for a BM prepared as described above was applied to the upper surface of the glass base material by means of a spin coating method to have a thickness of 1.2 μm, and the whole was pre-baked at 80° C. for 3 minutes. Then, the resultant was exposed to light (100 mJ/cm$^2$) by means of a mask formed into a predetermined pattern. Subsequently, the resultant was subjected to spray development with a 0.05% aqueous solution of KOH for 50 seconds. After that, the resultant was post-baked at 230° C. for 30 minutes to prepare a BM substrate.

Next, a red (R) pigment-dispersed photoresist was applied to the above BM substrate by means of a spin coating method, and the whole was pre-baked at 90° C. for 3 minutes. Then, the resultant was subjected to alignment exposure (100 mJ/cm$^2$) by means of a photomask for a predetermined coloring pattern. Subsequently, the resultant was subjected to spray development with a 0.1% aqueous solution of KOH for 50 seconds. After that, the resultant was post-baked at 230° C. for 30 minutes. As a result, a red (R) coloring pixel pattern having a thickness of 1.2 μm was formed at a predetermined position with respect to the BM pattern.

Subsequently, a green (G) coloring pixel pattern having a thickness of 1.2 μm was formed by means of the same method as the method of forming the above red (R) coloring pixel pattern and under the same conditions as those of the above method.

Furthermore, a blue (B) coloring pixel pattern having a thickness of 1.2 μm was formed by means of the same method as the method of forming the above red (R) coloring pixel pattern and under the same conditions as those of the above method.

Thus, the coloring layer constituted by the BM, the red coloring pixel, the green coloring pixel, and the blue coloring pixel formed on the substrate was formed.

Next, a base material 4 including a vertical alignment layer and a birefringence layer was formed on the upper surface of the coloring layer in the same manner as in Example 1.

After that, the base material 4 was baked in the same manner as in Example 1.

Subsequently, a surface layer was removed by a depth of about 1,000 Å from the surface of the base material 4 (surface opposite to the glass base material) in the same manner as in the base material 1 in Example 1. As a result, an optical element of the present invention including a coloring layer was produced.

Next, an acrylic resin was formed into a protective layer having a thickness of 1.0 μm by means of a spin coating method on the upper surface of the birefringence layer in the optical element obtained by removing the surface layer of the base material 4. Furthermore, indium tin oxide (ITO) was formed into a film-like common electrode portion on the upper surface of the protective layer. Meanwhile, thin-film transistors (TFT's) were formed at multiple predetermined sites on the same glass substrate as that used for the base material 4. Then, a transparent pixel electrode was formed of indium tin oxide (ITO) so as to be connected to the drain electrode of each TFT, thereby a counter electrode substrate was produced.

Then, a polyimide resin coating was applied in such a manner that each of the surface of the transparent common electrode and the surface of the transparent pixel electrode would be covered with the coating, and was dried to provide alignment layers (each having a thickness of 0.07 μm). Then, the resultant was subjected to an orientation treatment. Subsequently, both substrates were opposed to each other in such a manner that those alignment layers would face each other. A space between both substrates was sealed with a sealing member. Liquid crystal (MLC-6846-000 manufactured by Merck Ltd., Japan) was injected into the sealed space, and the inlet was sealed. Thus, a liquid crystal display device was produced and defined as Example 3.

Comparative Example 2

A liquid crystal display device was produced in the same manner as in Example 3 except that a base material 5 in which the upper surface of a birefringence layer was not removed (that is, an additive layer was present on the upper surface of the birefringence layer) was used instead of the base material 4 having the coloring layer formed in Example 3, and the device was defined as Comparative Example 2.

(Evaluation 3)

The contrast performance of each of the liquid crystal display devices of Example 3 and Comparative Example 2 was measured as described below.

Contrast performance measurement involves: forming a state where light that had passed through a liquid crystal layer in the above produced device could easily pass through a polarizing plate (light state) and a state where the light could not easily pass through the polarizing plate (dark state); and measuring the brightness of the light that had passed through the liquid crystal layer and the polarizing plate to travel toward the outside for each of the light state and the dark state. Then, a value obtained by dividing the brightness in the light state by the brightness in the dark state was used as an index showing contrast performance.

As a result, the contrast performance of Example 3 was 750. This value was sufficient for a liquid crystal display device. On the other hand, the performance of Comparative Example 2 was 450. This value was much lower than that of Example 3.

What is claimed is:

1. A method of producing an optical element, comprising:
coating a birefringence layer composition liquid comprising a liquid crystal monomer having a polymerizable group at a terminal thereof and an additive for promoting a homeotropic orientation of the liquid crystal monomer on a light transmitting base material;

homeotropically orienting the liquid crystal monomer;

crosslinking the liquid crystal monomer to form a birefringence layer to fix an orientation of the liquid crystal monomer;

baking the birefringence layer to improve heat resistance and adhesiveness of the birefringence layer by heating at a predetermined temperature; and removing an additive layer formed on an upper surface of the birefringence layer during baking by applying a solvent treatment with a spin coater, wherein:

the thickness of the additive layer to be removed is determined on the basis of the thickness of the additive layer to be formed upon design and production of the optical element, and a dose of light in the crosslinking step, the additive, and the amount of the additive to be added, and a haze of the optical element is reduced to 0.1 or less by removing the additive layer.

2. The method according to claim 1, wherein a coating film formed by coating the birefringence layer composition liquid on the base material is heated to homeotropically orient the liquid crystal monomer.

3. The method according to claim 1, wherein active radiation is irradiated on a coating film formed by coating the birefringence layer composition liquid on the base material to cause crosslinking.

4. The method according to claim 1, wherein baking is performed by heating at a temperature from 200 to 250° C. for 0.5 to 2.5 hours.

5. The method according to claim 1, wherein the additive is a polyimide, a surfactant, or a coupling agent.

6. The method according to claim 1, wherein a vertical alignment layer solution is coated on the base material and cured to form a vertical alignment layer, and the birefringence layer composition liquid is coated on the vertical alignment layer.

7. The method according to claim 6, wherein the vertical alignment layer contains a soluble polyimide, a polyamic acid, a surfactant, or a coupling agent.

8. The method according to claim 1, wherein a coloring layer is formed on an upper surface of the base material, and the birefringence layer composition liquid is coated on the coloring layer.

* * * * *